(12) United States Patent
Hirohata et al.

(10) Patent No.: US 8,200,813 B2
(45) Date of Patent: Jun. 12, 2012

(54) MONITORING DEVICE AND A SERVER

(75) Inventors: Kenji Hirohata, Tokyo (JP); Minoru Mukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 12/766,350

(22) Filed: Apr. 23, 2010

(65) Prior Publication Data

US 2010/0274833 A1      Oct. 28, 2010

(30) Foreign Application Priority Data

Apr. 24, 2009   (JP) ................................ 2009-106596

(51) Int. Cl.
*G06F 15/173* (2006.01)

(52) U.S. Cl. ........ 709/224; 709/202; 709/203; 702/182; 703/2

(58) Field of Classification Search .................. 709/202, 709/223–224, 203; 702/181–182, 2; 703/2
See application file for complete search history.

(56) References Cited

U.S. PATENT DOCUMENTS

| | | | |
|---|---|---|---|
| 6,999,895 B2* | 2/2006 | Guo et al. ...................... | 702/181 |
| 7,243,320 B2* | 7/2007 | Chiu et al. .................... | 716/106 |
| 7,505,875 B2* | 3/2009 | Jinzenji et al. ................ | 702/188 |
| 7,653,510 B2 | 1/2010 | Hirohata et al. | |
| 7,788,070 B2* | 8/2010 | Grichnik et al. ................... | 703/1 |
| 8,027,795 B2* | 9/2011 | Van Gorp et al. ............... | 702/60 |
| 2003/0023719 A1* | 1/2003 | Castelli et al. ................ | 709/224 |
| 2003/0061015 A1* | 3/2003 | Ben-Gal et al. .................... | 703/2 |
| 2006/0036403 A1* | 2/2006 | Wegerich et al. ............. | 702/183 |
| 2007/0203676 A1* | 8/2007 | Jinzenji et al. ................ | 702/189 |
| 2008/0059143 A1* | 3/2008 | Chiu et al. ....................... | 703/14 |
| 2008/0183444 A1* | 7/2008 | Grichnik et al. .................... | 703/2 |
| 2008/0249743 A1* | 10/2008 | Hirohata et al. .............. | 702/181 |

* cited by examiner

*Primary Examiner* — Oanh Duong
(74) *Attorney, Agent, or Firm* — Turocy & Watson, LLP

(57) ABSTRACT

According to one embodiment, each monitoring device acquires monitoring variables from an observation target, generates an individual multidimensional distribution of the monitoring variables, and transmits the individual multidimensional distribution to a server. The server generates sampling data using the individual multidimensional distribution received from each monitoring device, generates an overall multidimensional distribution of the monitoring variables using the sampling data, determines a statistical model of each index using the overall multidimensional distribution, generates an overall index multidimensional distribution of indexes using the statistical model and the overall multidimensional distribution, and transmits the overall index multidimensional distribution and statistical models to each monitoring device. The monitoring device generates sampling data using the individual multidimensional distribution, and calculates a positioning of the observation target using the sampling data, the overall index multidimensional distribution and the statistical models.

7 Claims, 16 Drawing Sheets

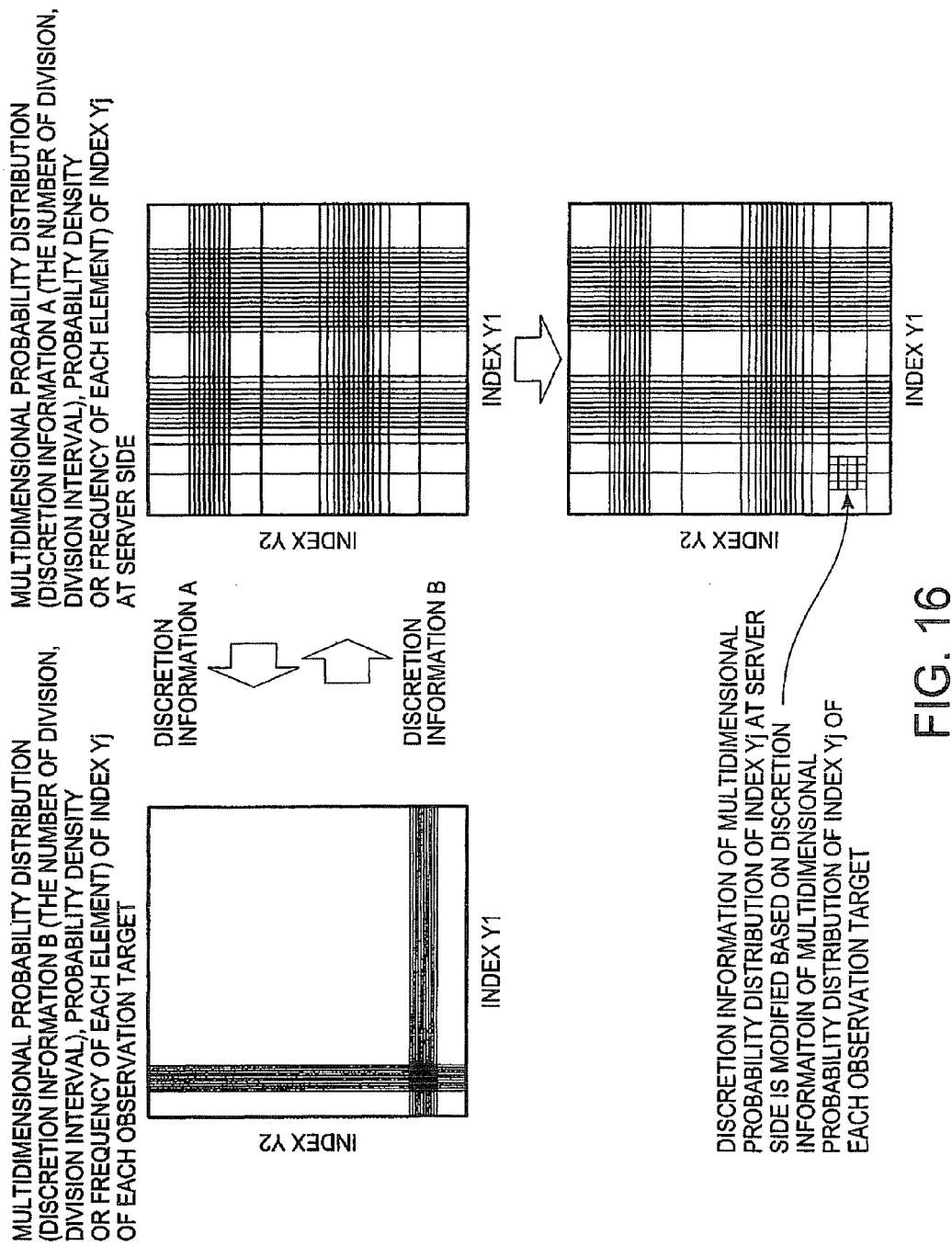

MONITORING DEVICE AND A SERVER

CROSS-REFERENCE TO RELATED APPLICATION

This application is based upon and claims the benefit of priority from Japanese Patent Application No. 2009-106596, filed on Apr. 24, 2009; the entire contents of which are incorporated herein by reference.

FIELD

Embodiments described herein relate generally to a device for monitoring an observation target and a server for communicating with the device via a network.

BACKGROUND

As a method for statistically calculating/displaying a positioning of each observation target (an electronic device or a person) in an overall set, usually, a statistical method such as a principal component analysis, a correspondence analysis, a cluster analysis, a multidimensional scaling method, a self-organization map, a factor analysis and a covariance structure analysis, is used. When each data of the observation target is a frequency distribution set which is non-symmetric and complicated (such as non-normal distribution or multimodal distribution), if the data is not adapted by variable transformation or category classification, it is often difficult that the positioning of each observation target is rationally computed.

On the other hand, from a data set acquired by observing a complicated natural phenomenon or a social phenomenon, a method for extracting new information or a feature pattern and for utilizing them to make clear the phenomenal mechanism, predicate or control, exists. For example, a statistical calculation method such as bootstrap method using Monte Carlo method (by a large number of repeat calculations using a computer) is put to practical use for data mining, as a statistical estimation method.

Many statistical estimation methods are formatted based on mutually independent probability variables $Y_j$ with an unknown distribution function F, as a problem to estimate a parameter $\theta = \theta$ (F) with F. In this case, the parameter $\theta$ includes not only a basic statistical quantity such as an average and a moment but also another parameter such as error decision rate of monitoring diagnostics method, a statistical model parameter of a regression model, and a failure probability of reliability prediction. As a feature of the bootstrap method, an estimation quantity is identified by replacing an unknown population distribution F with an empirical distribution $F_n$ (composing a data set). As the empirical distribution, following empirical distribution function is often used.

$$F_n(y) = \frac{1}{n} \sum_{j=1}^{n} \delta(Y_j \leq y), \quad -\infty < y < \infty$$

$\delta(Y_j \leq y)$ IS A FUNCTION DEFINED AS FOLLOWS.

$$\delta(Y_j \leq y) = \begin{cases} 1 & Y_j \leq y \\ 0 & Y_j > y \end{cases}$$

In a conventional technology, in state that data of each observation target is collected with online and an overall set of observation targets is changing in real time, when each positioning in the overall set need be rationally calculated, if scale of a date set acquired from each observation target is large or if the number of observation targets is large, a communication quantity thereof is large and a calculation speed thereof is slow. Furthermore, if data quantity collected is insufficient, proper calculation of a positioning to reflect a true feature of the population distribution F is also difficult. Furthermore, the data quantity to be stored in each observation target and a server becomes large.

BRIEF DESCRIPTION OF THE DRAWINGS

FIG. 16 is a schematic diagram to explain a third calculation example of discretion information.

DETAILED DESCRIPTION

Figure 1:
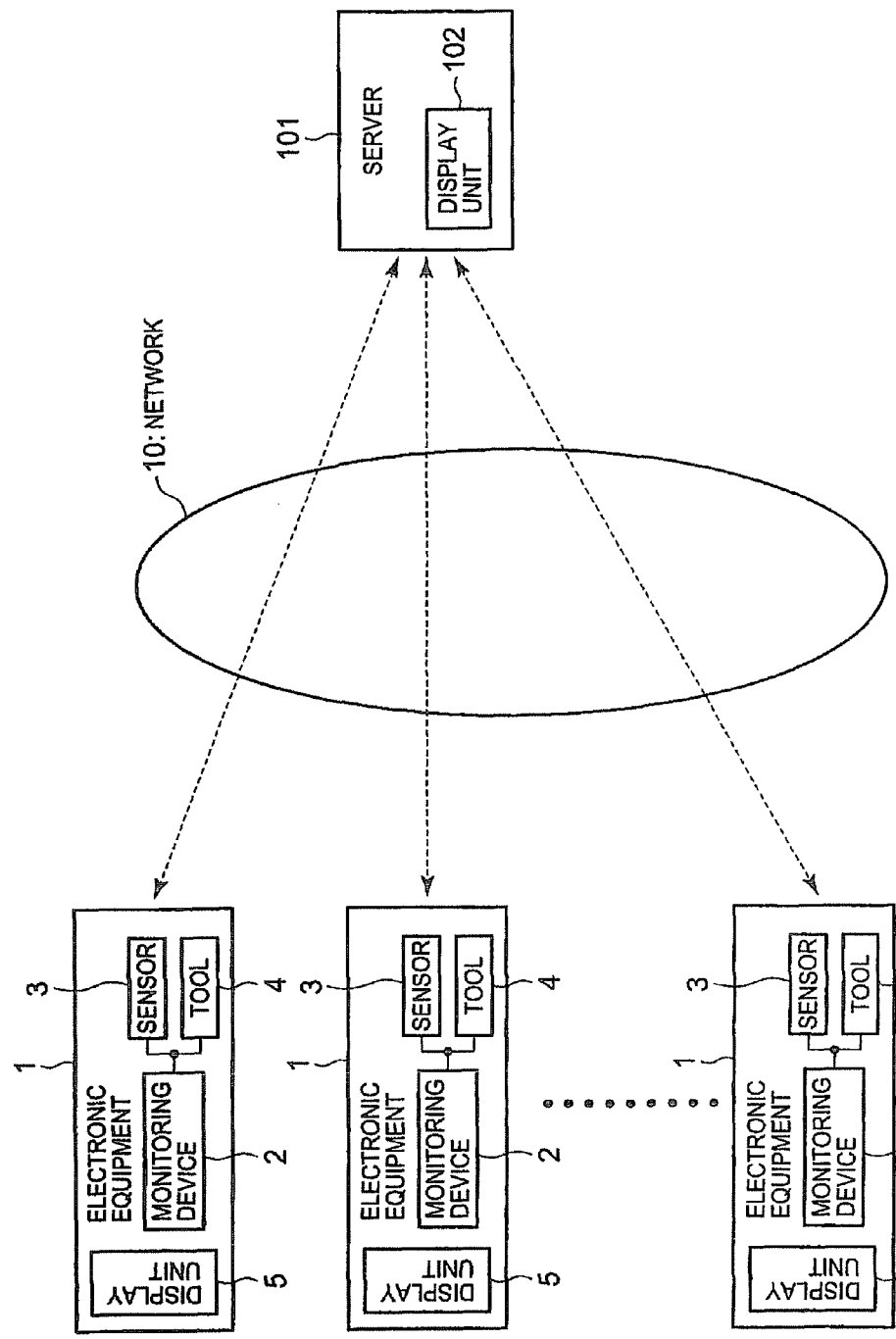
FIG. 1 is a block diagram of a health monitoring system.

In general, according to one embodiment, a server communicates with a plurality of monitoring devices via a network. Each monitoring device acquires monitoring variables (1~H; H is an integral number larger than 1) from an observation target and generates an individual multidimensional distribution of the monitoring variables. The server includes a receiving unit, a first server side generation unit, a statistical estimation unit, a second server side generation unit, and a transmission unit. The receiving unit is configured to collect the individual multidimensional distribution from each monitoring device. A first space defined by axes of the monitoring variables (1~H) is divided into a plurality of first elements at each monitoring device. The individual multidimensional distribution represents a probability density or a frequency of the monitoring variables belonging to each first element in the first space. A first server side generation unit is configured to generate first sampling data by sampling the individual multidimensional distribution collected, to determine a first discretion parameter using the first sampling data so that a first evaluation function including the first discretion parameter is maximized or minimized, to divide the first space into a plurality of second elements by the first discretion parameter, and to generate an overall multidimensional distribution representing a probability density or a frequency of the first sampling data belonging to each second element in the first space. The first discretion parameter indicates a method for dividing the first space. A statistical estimation unit is configured to determine a model parameter of statistical models (1~K; K is an integral number larger than 1) using the overall multidimensional distribution so that a second evaluation function including the model parameter is maximized or minimized. The model parameter is used for calculating indexes (1~K) to evaluate a state of each observation target from the monitoring variables. A second server side generation unit is configured to generate a second sampling data by sampling the overall multidimensional distribution, to calculate index data of the indexes (1~K) by calculating the statistical models with the second sampling data, to determine a second discretion parameter using the index data so that a third evaluation function including the second discretion parameter is maximized or minimized, to divide a second space into a plurality of third elements by the second discretion parameter, and to generate an overall index multidimensional distribution representing a probability density or a frequency of the index data belonging to each third element in the second space. The second discretion parameter indicates a method for dividing the second space defined by axes of the indexes (1~K). A transmission unit is configured to transmit the overall index multidimensional distribution and the statistical models (1~K) having the model parameter to each monitoring device.

Hereinafter, one embodiment will be explained by referring to the drawings.

FIG. 1 is a block diagram of a health monitor system according to one embodiment. A plurality of monitoring devices 2 to monitor each observation target is connected to a server 101 to collect data via unwired/wired network 10. Each observation target is, for example, an electronic equipment (such as a personal computer) or a person. The monitoring device 2 is located in correspondence with each observation target. In the present embodiment, the observation target is the electronic equipment 1. The monitoring device 2 is respectively located in the electronic equipment 1. If the observation target is a person, for example, the monitoring device 2 is attached onto the person. In the electronic equipment 1, in addition to the monitoring device 2, a monitoring sensor 3, a monitoring tool 4, and a display unit 5 to display data, are installed. The display unit 5 may be located in the monitoring device 2. Furthermore, a display unit 102 to display data is installed in the server 101. The monitoring device 2 in the electronic equipment 1 can communicate with the server 101 via a network 10.

Figure 2:
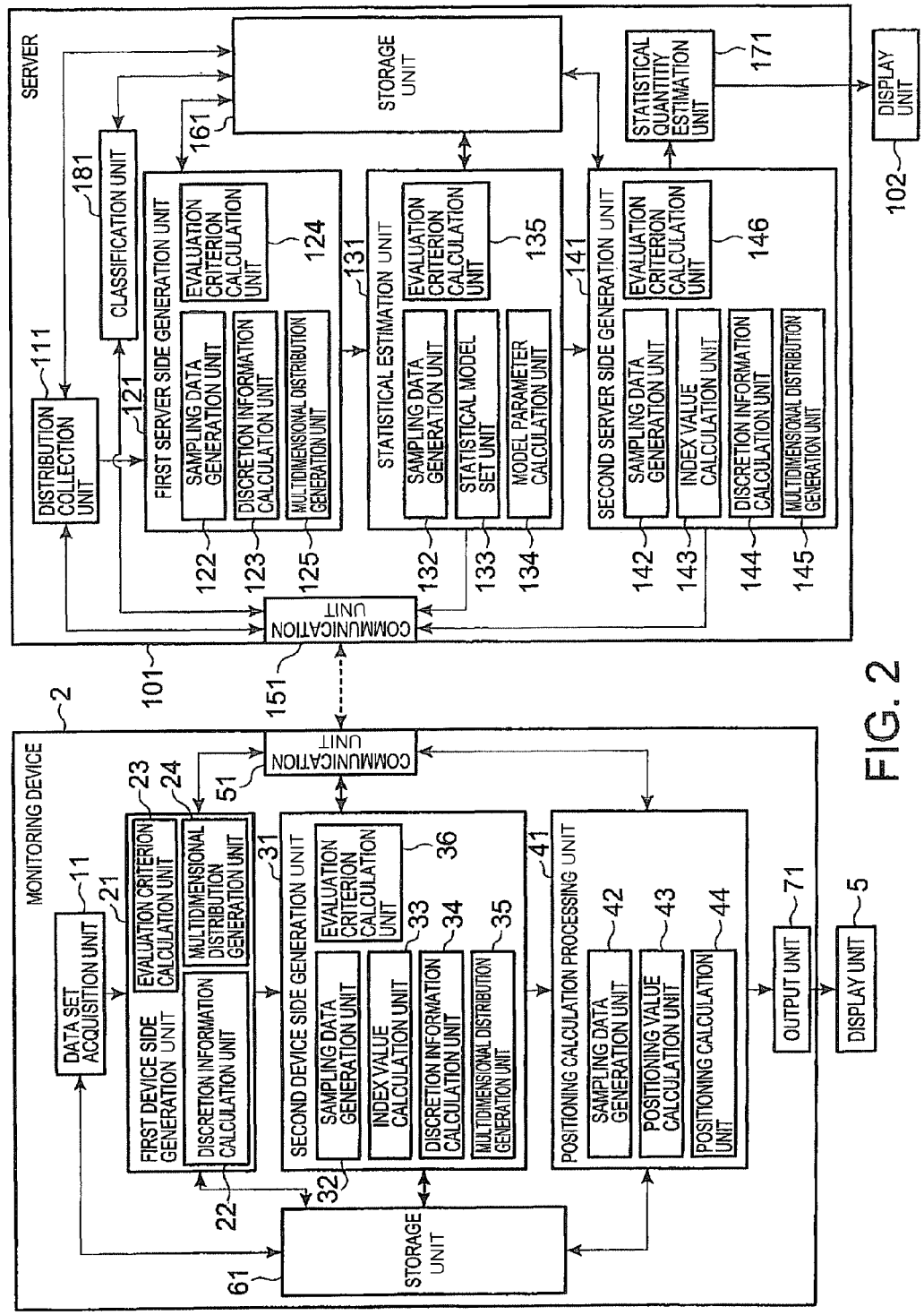
FIG. 2 is a block diagram of a monitoring device and a server according to one embodiment.

FIG. 2 is a block diagram of the monitoring device 2 and the server 101, In order to simplify, one monitoring device 2 is only shown. The monitoring device 2 includes a data set acquisition unit 11, a first device side generation unit 21, a second device side generation unit 31, a positioning calculation processing unit 41, a communication unit 51, a storage unit 61, and an output unit 71. The server 101 includes a distribution collection unit 111, a first server side generation unit 121, a statistical estimation unit 131, a second server side generation unit 141, a communication unit 151, a storage unit 161, a statistical quantity estimation unit 171 and a classification unit 181. In the monitoring device 2 and the server 101, each unit 11~51, 71, 111~151 and 171 includes an internal buffer and has a function to temporarily preserve each data (including mediate data occurred during operation) necessary for operation.

Figure 3:
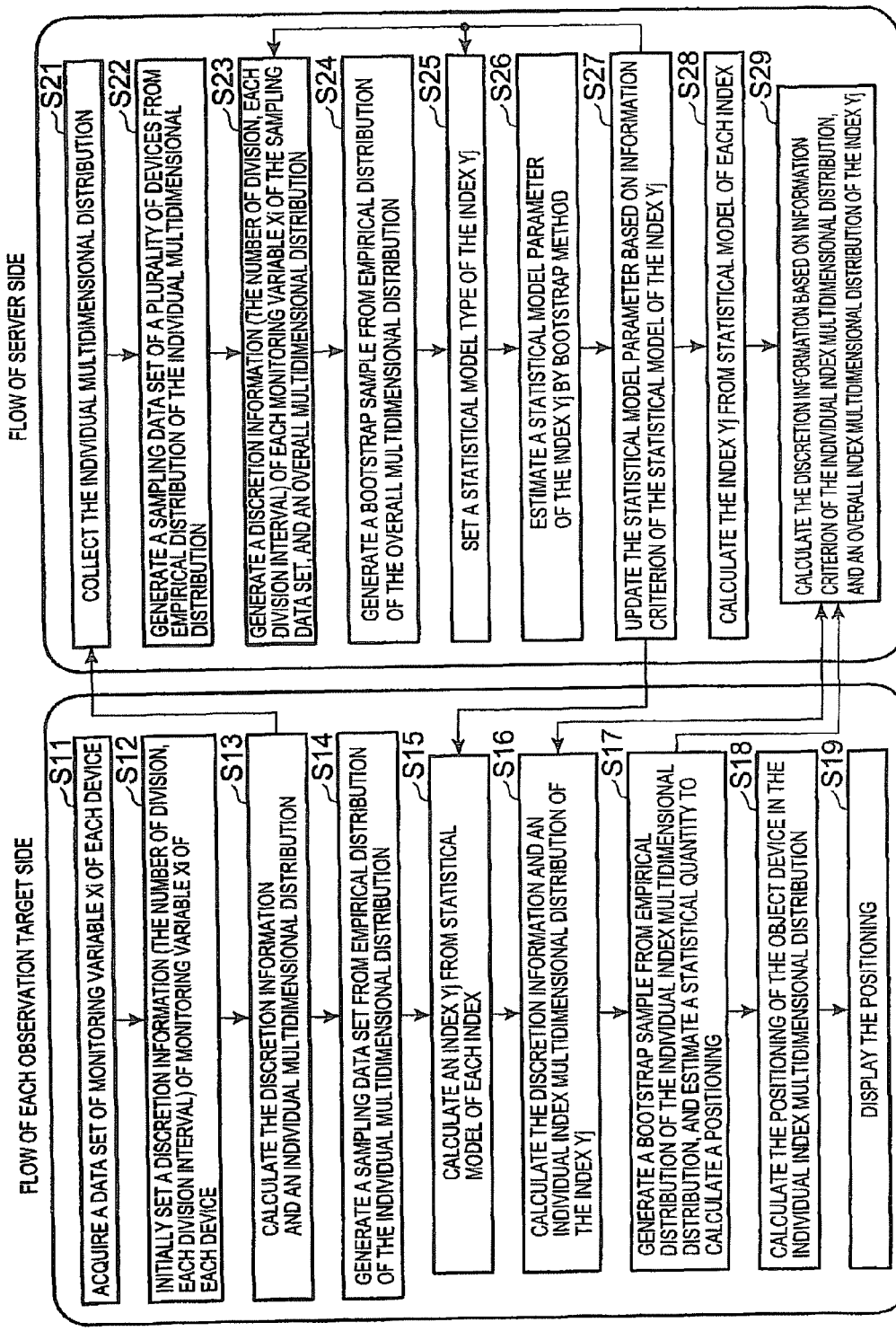
FIG. 3 is a flow chart of processing between the monitoring device and the server in FIG. 2.
Figure 4:
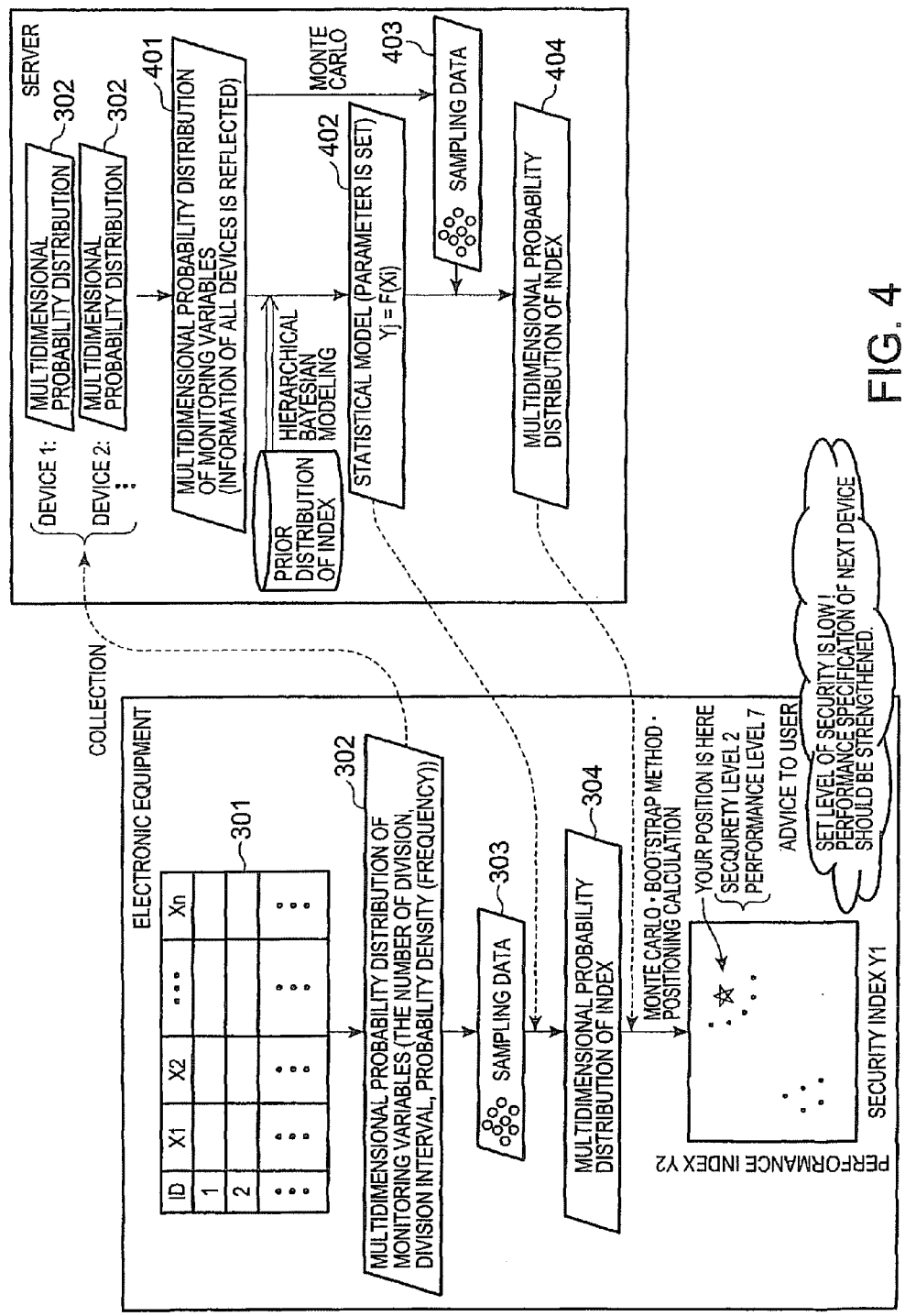
FIG. 4 is a data flow in the flow chart of FIG. 3.

FIG. 3 shows a processing flow between the monitoring device 2 and the server 101. In detail, as to each electronic equipment, FIG. 3 shows a processing flow to calculate a positioning of the electronic equipment in a space defined by axes as a plurality of indexes (index for failure precursor and index for usage trend, refer to FIGS. 8~11) to evaluate a state of the electronic equipment. The positioning means a position of the electronic equipment in all electronic equipments, i.e., the position in the space defined by axes as the plurality of indexes. Furthermore, FIG. 4 shows a data flow generated in the processing flow of FIG. 3. Hereinafter, by referring to FIGS. 3 and 4, operation of the monitoring device 2 and the server 101 in FIG. 2 is explained. In this case, the operation without the classification unit 181 and the statistical quantity estimation unit 171 in server 101 is explained.

Figure 5:
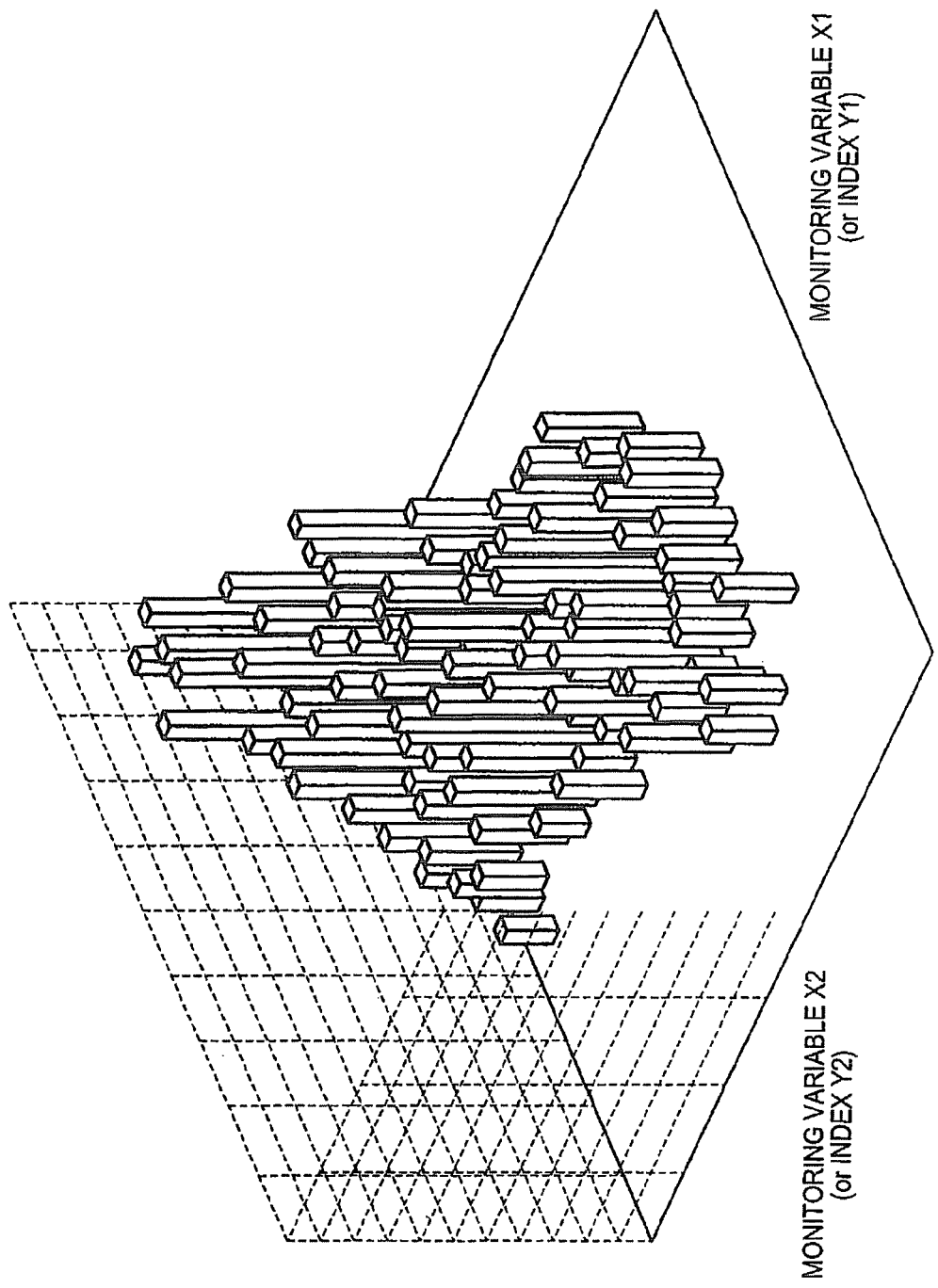
FIG. 5 is one example of a multidimensional frequency distribution.

At S11, the data set acquisition unit 11 in the monitoring device 2 acquires data 301 comprising monitoring variables $X_i$ ($i=1,2,3,\ldots,H$; H is an integral number larger than 1) of H units (Hereinafter, it is called H-monitoring variables), using the monitoring sensor 3 or the monitoring tool 4. For example, the monitoring sensor 3 detects a physical quantity such as a temperature of the observation target, and the monitoring tool 4 detects a state quantity of the observation target such as a load rate of CPU or the number of rotation of fan (Refer to FIGS. 9 and 11). The monitoring variable acquired may be the physical quantity or the state quantity itself. Alternatively, an operation value by a plurality of physical quantities, an operation value by a plurality of state quantities, or an operation value by the physical quantity and the state quantity, may be acquired as the monitoring variable. For example, a temperature difference between two temperature sensors may be acquired as the monitoring variable. The data set acquisition unit 11 stores a set of data 301 comprising H-monitoring variables $X_i$ (acquired) into the storage unit 61. FIG. 5 shows an example of a frequency distribution (multidimensional frequency distribution) which the set of data 301 is represented in a space defined by axes of each monitoring variable. In FIG. 5, the case of two monitoring variables ($X_1$, $X_2$) is shown.

Figure 13:
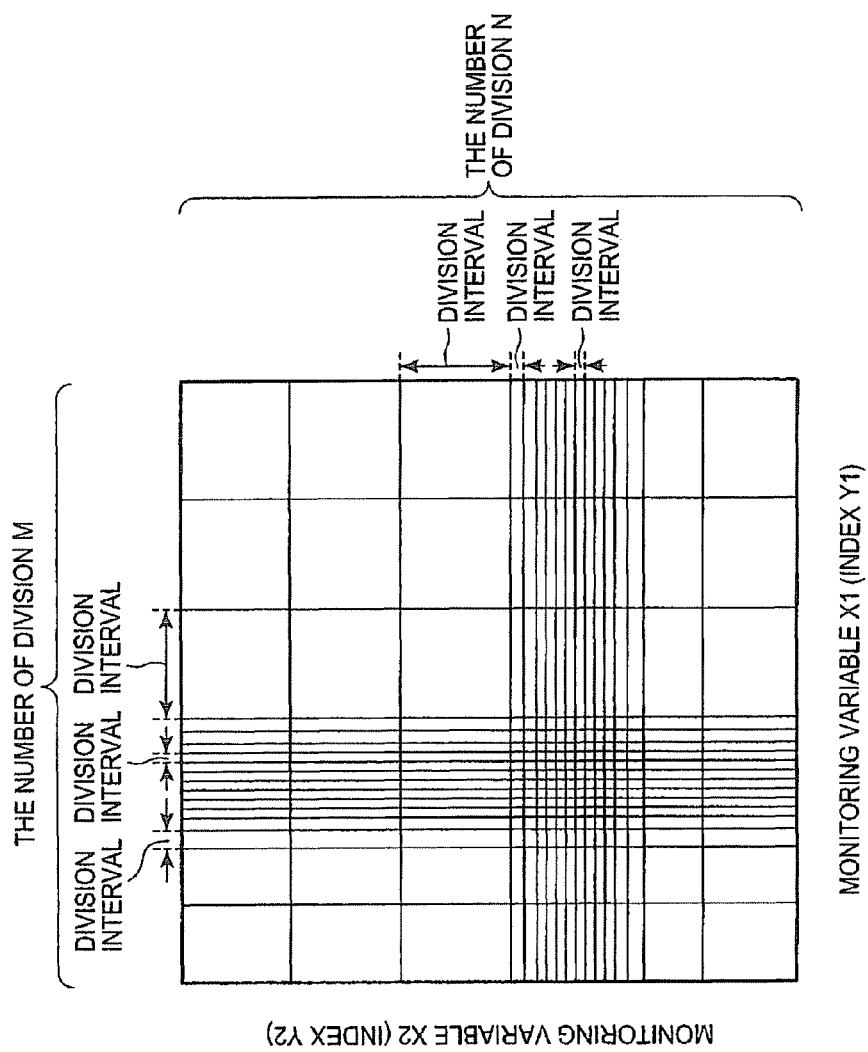
FIG. 13 is a schematic diagram to explain a method for dividing an overall set.

At S12, in the first device side generation unit 21, a discretion information calculation unit 22 sets an initial value of discretion information (a third discretion parameter necessary for space division, such as the number of division and an interval of each divided section) representing a method for dividing a space defined by axes of H-monitoring variables $X_i$ (Refer to FIG. 13). The discretion information (the third discretion parameter) is used for discretizing a data set comprising H-monitoring variables $X_i$.

At S13, the discretion information calculation unit 22 optimizes an evaluation function (fourth evaluation function) including the third discretion parameter by changing the initial value. For example, the evaluation function is a function to calculate an information criterion such as AIC (Akaike's information criterion), and another evaluation criterion. The optimization exemplarily means maximization or minimization, which is determined by a type of the evaluation criterion. In this case, if the monitoring variable is two-dimensional value, as shown in FIG. 13, the discretion information (the third discretion parameter) includes necessary information to describe the method for dividing two-dimensional space into a plurality of elements, i.e., the number of division along each axis, and a size and a position of each element. For example, a range of the space as an object may be a range between a minimum and a maximum of data acquired for each monitoring variable, or a predetermined range. In FIG. 13, two-dimensional space is respectively divided along two axes directions of monitoring variables $X_1$ and $X_2$ by the number of division "17". Briefly, in FIG. 13, the number of division "M and N" is respectively 17. Moreover, N and N may be different. Calculation of the evaluation function (calculation of the evaluation criterion) is executed by an evaluation criterion calculation unit (information criterion calculation unit) 23. As the evaluation criterion, for example, AIC, a general information criterion (GIC), a bootstrap information criterion and a Bayesian type information criterion, are used. The evaluation criterion is not limited to them, and the evaluation function based on arbitrary evaluation criterion may be used.

Next, a multidimensional distribution generation unit 24 divides the space based on the optimized discretion information (optimized third discretion parameter), i.e., a data set of H-monitoring variables Xi is discretized. As a result, each data in the data set belongs to any of each division element shown in FIG. 13. From the data set discretized, the multidimensional distribution generation unit 24 generates a multidimensional probability distribution or a multidimensional frequency distribution (Hereinafter, it is called a multidimensional probability distribution 302) based on the number of data belonging to each division element. In this case, the multidimensional probability distribution and the multidimensional frequency distribution correspond to an individual multidimensional distribution. The multidimensional probability distribution (individual multidimensional distribution) 302 includes the optimized discretion information, and a probability density or a frequency of data belonging to each division element. The first device side generation unit 21 transmits the multidimensional probability distribution (individual multidimensional distribution) 302 to the server 101 via the communication unit 51 (transmission/receiving unit). After the multidimensional probability distribution (individual multidimensional distribution) 302 is generated, the first device side generation unit 21 may delete a data set used fat generation of this distribution 302 from the storage unit 61.

Figure 14:
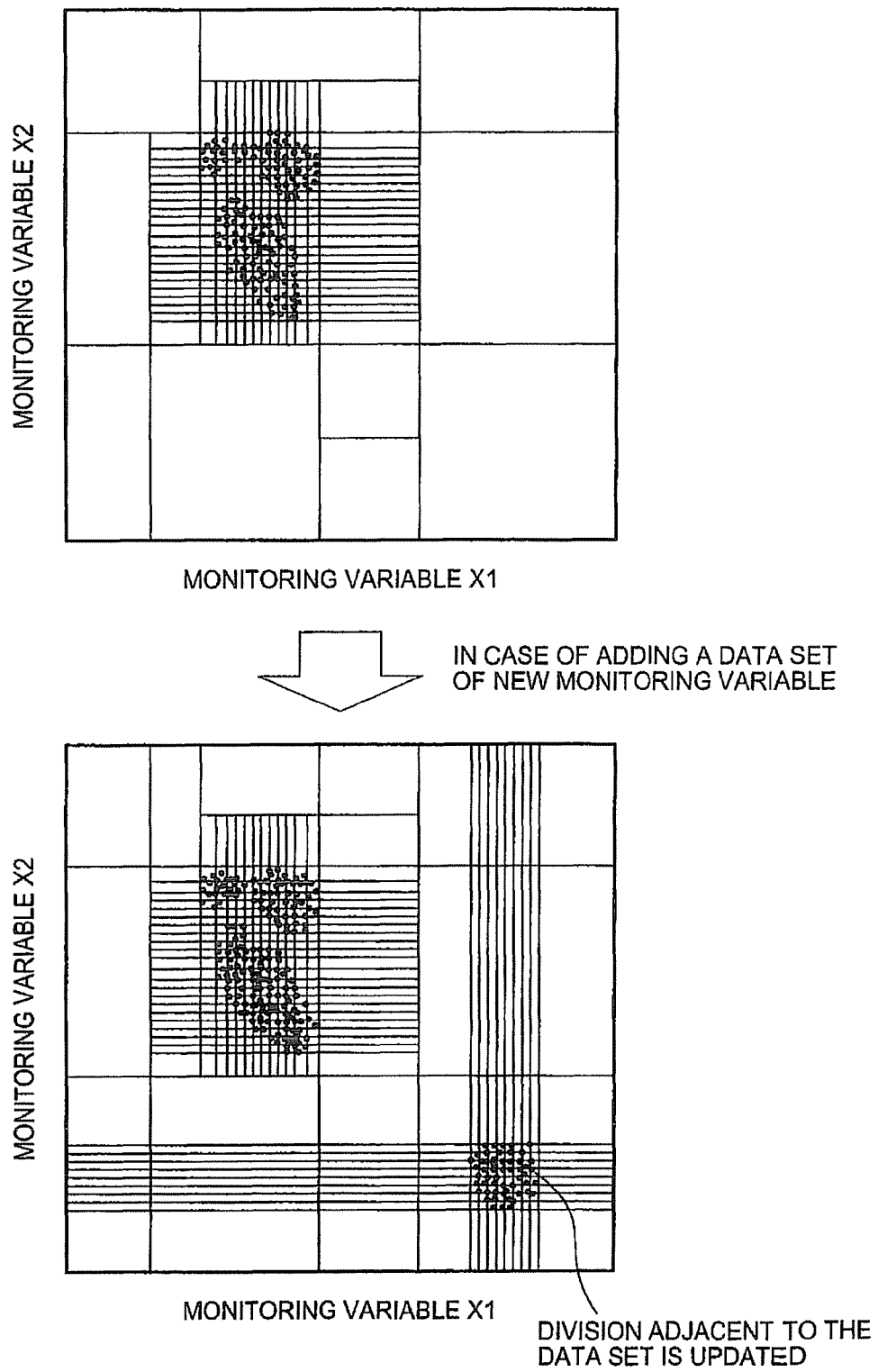
FIG. 14 is a schematic diagram to explain a first calculation example of discretion information.

In this case, at S11, if new data set of a predetermined quantity is acquired or if a predetermined period has passed, by calculating new discretion information (third discrete parameter) at S12 and S13, new multidimensional probability distribution (individual multidimensional distribution) 302 may be calculated and transmitted to the server 101. As concrete steps, first, by using the multidimensional probability distribution (individual multidimensional distribution) 302 (generated before the new data set is added) as an empirical distribution, as shown in upper part of FIG. 14, sampling points (sampling data) of a predetermine number are calculated by Monte Carlo method. Next, a sampling set of the sampling data is unified with the new data set as shown in lower part of FIG. 14. Last, new discretion information and new multidimensional probability distribution (individual multidimensional distribution) 302 are calculated so that the evaluation function is optimized for the unified data set. As clearly understood from FIG. 14, the method for dividing the space may include a local division of the space except for a traversal division of the space.

At S21, the distribution collection unit 111 in the server 101 collects the multidimensional probability distribution (individual multidimensional distribution) 302 of H-monitoring variables Xi from each monitoring device 2. The distribution collection unit 111 stores the multidimensional probability distribution (individual multidimensional distribution) 302 (collected from each monitoring device 2) into the storage unit 161.

At S22, a sampling data generation unit 122 in the first server side generation unit 121 generates a plurality of sampling points (sampling data) by subjecting Monte Carlo method to the multidimensional probability distribution (individual multidimensional distribution) 302 as an empirical distribution. Briefly, a set of sampling data comprising H-monitoring variables Xi is generated. This processing is executed for each electronic equipment 1 (each monitoring device 2), and the set of sampling data is acquired for each monitoring device 2. This processing of S22 is exemplarily executed when the multidimensional probability distribution (individual multidimensional distribution) is collected or when a condition (a period or a monitoring variable area) of a data set as an object is changed. When the condition of the data set is changed, new multidimensional probability distribution (new individual multidimensional distribution) is collected from each monitoring device based on the condition.

At S23, a discretion information calculation unit 123 in the first server side generation unit 121 calculates discretion information (first discretion parameter) describing a method for dividing a space comprising H-monitoring variables Xi.

Concretely, an initial value of the discretion information (first discretion parameter) is set. Then, by changing the initial value, an evaluation function (first evaluation function) including the first discretion parameter is optimized (maximized or minimized). Calculation of the evaluation function (evaluation criterion) is executed by an evaluation criterion calculation unit (information criterion calculation unit) 124. As the evaluation criterion, for example, AIC, a general information criterion (GIC), a bootstrap information criterion, and a Bayesian information criterion, are used. The evaluation criterion is not limited to them, and may be an evaluation function based on arbitrary evaluation criterion. The optimized discretion information (first discretion parameter) is stored in the storage unit 161.

After that, a multidimensional distribution generation unit 125 divides the space into a plurality of division elements based on the optimized discretion information. As a result, each sampling data in an overall sampling data set (a sampling data set of each monitoring device 2 is unified) belongs to any of division elements, i.e., the overall sampling data sot is discretized. The multidimensional distribution generation unit 125 generates a multidimensional probability distribution or a multidimensional frequency distribution (Hereinafter, it is called a multidimensional probability distribution 401) of H-monitoring variables Xi, based on the number of sampling data belonging to each division element. This multidimensional probability distribution or multidimensional frequency distribution corresponds to an overall multidimensional distribution. This multidimensional probability distribution (overall multidimensional distribution) 401 includes the optimized discretion information (first discretion parameter), and a probability density or a frequency which data belongs to each division element. The multidimensional distribution generation unit 125 stores the multidimensional probability distribution (overall multidimensional distribution) 401 into the storage unit 161.

At S24, a sampling data generation unit 132 in the statistical estimation unit 131 generates a plurality of bootstrap samples by subjecting Monte Carlo method to the multidimensional probability distribution (overall multidimensional distribution) 401 as an empirical distribution. Briefly, one bootstrap sample is generated by acquiring a plurality of sampling points (sampling data) comprising H-monitoring variables Xi with Monte Carlo method. By repeating this processing, a plurality of bootstrap samples is acquired.

At S25, as to each of indexes Yj (j=1,2,3, . . . , K: K is an integral number larger than "1") to evaluate a state of the electronic equipment, a statistical model set unit 133 in the statistical estimation unit 131 sets a statistical model type (type of first~K-th statistical model) to estimate the index Yj from a plurality of monitoring variables (In this case, model parameter is unknown). As to the statistical model, for example, various types such as a hierarchical Bayesian model, a polynomial expression model and a regression model are used (Refer to FIGS. 9 and 11). A plurality of types may exist in the same model (For example, a model having a square term and the model not having the square term).

At S26, for each statistical model of the index Yj, a model parameter calculation unit 134 in the statistical estimation unit 131 estimates a model parameter of the statistical model by bootstrap method. Briefly, a model parameter of each bootstrap sample (acquired at S24) is estimated, and a representative value (such as the most frequent value or a center value) of the model parameter of each bootstrap sample is determined as a model parameter of the statistic model of the index Yj. Based on the bootstrap sample, the model parameter is estimated by optimizing an evaluation function (second evaluation function) including the model parameter of each statistical model. Calculation of the evaluation function is executed by an evaluation criterion calculation unit (information criterion calculation unit) 135. As the evaluation criterion, for example, ABIC (Akaike's Bayesian information criterion), AIC, a general information criterion (GIC), a bootstrap information criterion and a Bayesian information criterion, are used. The evaluation criterion is not limited to them, and may be an evaluation function based on arbitrary evaluation criterion. In this way, as to each index Yj, the model parameter of each statistical model is estimated (estimation method is explained in detail, afterwards). The statistical model type and the model parameter of each index Yj (i.e., a statistical model 402 having the model parameter) are stored in the storage unit 161.

At S27, the statistical estimation unit 131 stores the second evaluation function (a value of the evaluation criterion such as the information criterion, optimized at S26) of each statistical model into the storage unit 161, and returns processing to S25. At S25, a different statistical model type is set for each index Yj. At next S26, a model parameter is estimated for each index Yj, and an evaluation function (evaluation criterion) of a statistical model of each index Yj is calculated. Last, a statistical model type and a model parameter of which evaluation function value is most optimized are selected for each index Yj. In this case, steps S25-S27 are repeatedly executed. However, by executing steps S25-S27 one time, processing may be forwarded to next step S28. The statistical estimation unit 131 transmits the statistical model 402 (statistical model having the model parameter) of each index Yj to the monitoring device 2 of each electronic equipment 1 via the communication unit (transmission/receiving unit) 151.

At S28, the second server side generation means unit 141 calculates a value of index Yj based on the statistical model 402 of each index Yj, by using an overall multidimensional probability distribution (overall multidimensional distribution) 401 calculated at S523. In detail, a sampling data generation unit 142 in the second server side generation unit 141 generates a plurality of sampling data (sampling points) 403 comprising H-monitoring variables Xi by Monte Carlo method, based on the overall multidimensional probability distribution (overall multidimensional distribution) 401. Then, an index value calculation unit 143 calculates a value of each index Yj from each statistical model 402, for each sampling data 403. As a result, value data of each index Yj is acquired in correspondence with each sampling data 403. Moreover, if the statistical model 402 is a distribution model such as a Bayesian hierarchical model (explained afterwards), an expected value of distribution acquired in correspondence with the sampling data 402 is acquired as a value of index Yj. A set of data acquired is stored in the storage unit 161. FIG. 5 shows an example of the multidimensional frequency distribution (before discretization) of the set of data. In FIG. 5, the case of two indexes (Y1, Y2) is shown.

At S29, a discretion information calculation unit 144 in the second server side generation unit 141 calculates discretion information (second discretion parameter such as the number of division and a division interval) indicating a method for dividing a space defined by axes as a plurality of indexes Yj. This discretion information (second discretion parameter) is used for discretizing a data set of each index Yj (acquired at S28). Then, a multidimensional distribution generation unit 145 divides the space (the data set of Yj is discretized) using the discretion information (second discretion parameter), and calculates a multidimensional probability distribution (overall index multidimensional distribution) 404 of a plurality of indexes Yj, based on the number of data included in each division element.

Concretely, first, the discretion information calculation unit 144 sets an initial value of the discretion information (second discretion parameter), and optimizes an evaluation function (third evaluation function) including the second discretion parameter by changing the initial value. For example, optimization means maximization or minimization. Then, the discretion information (second discretion parameter) optimized is selected. In this case, if index Yj is two-dimensional value, as shown in FIG. 13, the discretion information (second discretion parameter) is necessary information to describe a method for dividing into a plurality of elements, for example, the number of division along each axis, a size and a position of each division element. Calculation of the evaluation function (evaluation criterion) is executed by an evaluation criterion calculation unit (information criterion calculation unit) 146. As the evaluation criterion, for example, AIC, a general information criterion (GIC), a bootstrap information criterion and a Bayesian information criterion, are used. The evaluation information is not limited to them, and may be an evaluation function based on arbitrary evaluation criterion. The discretion information (second discretion parameter) is stored in the storage means unit 161.

Then, the multidimensional distribution generation unit 145 divides a space defined by axes of indexes Yj into a plurality of division elements (i.e., data set of indexes Yj calculated at S28 is discretized), based on the discretion information (second discretion parameter). As a result, each data of the data set belongs any of each division element shown in FIG. 13. A range of the space as an object may be a range between a maximum and a minimum of acquired data, or a predetermined range. After that, a multidimensional probability distribution (overall index multidimensional distribution) 404 of indexes Yj is calculated based on the discretized data set. This multidimensional probability distribution (overall index multidimensional distribution) 404 includes the optimized discretion information (second discretion parameter), and a probability density or a frequency which data belongs to each division element. The second server side generation unit 141 stores the multidimensional probability distribution (overall index multidimensional distribution) 404 into the storage unit 161, and transmits it to the monitoring device 2 of each electronic equipment via the communication unit 151.

Figure 15:
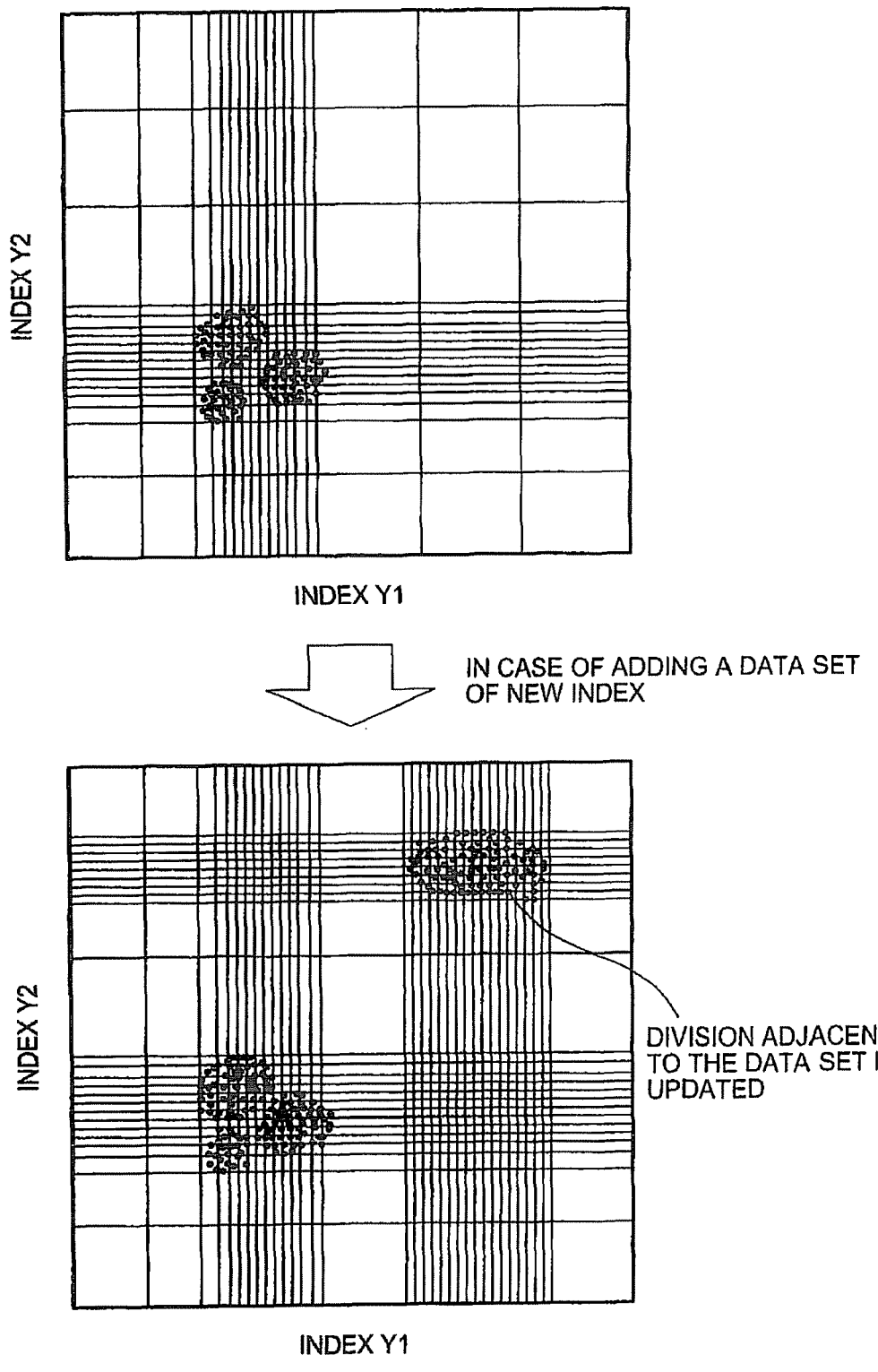
FIG. 15 is a schematic diagram to explain a second calculation example of discretion information.

In this case, when new data set is acquired at S28, new discretion information (second discretion parameter) is calculated, and new multidimensional probability distribution (overall index multidimensional distribution) 404 is calculated. The case that new data set is acquired is, for example, a multidimensional probability distribution from an electronic equipment newly added is acquired at S21, and processing of S28 is executed by updating the statistical model at S25 and S26. As concrete steps, first, by using the multidimensional probability distribution (overall index multidimensional distribution) 404 (generated before new data set is added) as an empirical distribution, as shown in upper part of FIG. 15, sampling points (sampling data) of predetermined number is calculated by Monte Carlo method. This sampling data set is unified with the new data set (Refer to lower part of FIG. 15). As to the unified data set, new discretion information and new multidimensional probability distribution (overall index multidimensional distribution) 404 are calculated so that the third evaluation function (evaluation criterion) is optimized. The method for dividing the space may include a local division of the space except for a traversal division of the space (Refer to FIG. 14).

On the other hand, in the monitoring apparatus 2, at S14, a sampling data generation unit 32 of the second device side generation unit 31 generates a set of sampling data (sampling points) 303 comprising monitoring variables Xi by Monte Carlo method with the multidimensional probability distribution (individual multidimensional distribution) 302 (calculated at S13) as the empirical distribution.

Next, at S15 or prior arbitral step thereof, an index value calculation unit 33 acquires a statistical model (type and model parameter) 402 of each index Yj from the server 101 via the communication unit 51. Then, at S15, the index value calculation unit 33 calculates a value of index Yj from each sampling data 303 (generated at S14), for each statistical model 402 of the index Yj. As a result, data comprising the value of each index Yj is acquired for each sampling data (sampling point) 303. Moreover, if the statistical model 402 is a distribution model such as a Bayesian hierarchical model explained afterwards, an expected value of a distribution acquired in correspondence with the sampling data 402 is acquired as a value of index Yj. A set of acquired data is stored in the storage unit 61.

At S16, a discretion information calculation unit 34 in the second device side generation unit 31 calculates discretion information (fourth discretion parameter) indicating a method for dividing a space comprising a plurality of indexes Yj. Then, a multidimensional distribution generation unit 35 divides the space into a plurality of division elements (a data set comprising each index Yj acquired at S15 is discretized) based on the discretion information (fourth discretion parameter), and calculates a multidimensional probability distribution (individual index multidimensional distribution) 304 of a plurality of indexes Yj.

Concretely, the discretion information calculation unit 34 seta an initial value of the discretion information (fourth discretion parameter), and optimizes (a predetermined evaluation criterion is optimized) an evaluation function (fifth evaluation function) including the fourth discretion parameter by changing the initial value. Thus, the discretion information (fourth discretion parameter) of which a value of the evaluation function (evaluation criterion) is optimized (maximized or minimized) is selected. Calculation of the evaluation function (evaluation criterion) is executed by an evaluation criterion calculation unit (information criterion calculation unit) 36. As the evaluation criterion, for example, AIC, a general information criterion (GIC), a bootstrap information criterion and a Bayesian information criterion, are used. The evaluation criterion is not limited to them, and may be an evaluation function based on arbitrary evaluation criterion. The optimized discretion information (fourth discretion parameter) is stored in the storage unit 61. The multidimensional distribution generation unit 35 divides the space (a data set comprising each index Yj acquired at S15 is discretized) based on the optimized discretion information (fourth discretion parameter), and calculates a multidimensional probability distribution (individual index multidimensional distribution) 304 of a plurality of indexes Yj based on the number (frequency) of data included in each division element. At S16 or prior arbitrary step thereof, the second device side generation unit 31 receives a multidimensional probability distribution 404 of index Yj from the server 101.

At s17, a sampling data generation unit 42 in the positioning calculation processing unit 41 generates a plurality of bootstrap samples by using the multidimensional probability distribution (individual index multidimensional distribution) 304 as an empirical distribution. Briefly, by acquiring a set of sampling data (sampling points) comprising a plurality of indexes Yj with Monte Carlo method, one bootstrap sample is generated. By repeating this processing, a plurality of bootstrap samples is generated. After the plurality of bootstrap samples is generated, a positioning value calculation unit 43 in the positioning calculation processing unit 41 transforms a multidimensional probability distribution 404 of index Yj (from the server 101) to an accumulated probability distribution (For example, a horizontal axis represents each index, and a vertical axis represents an accumulated probability), and executes following processing (1)~(3). Moreover, this accumulated probability distribution has a stair-shape and, if necessary, may be transformed to a smooth distribution by known supplement processing.

(1) One bootstrap sample is selected from the plurality of bootstrap samples. As to each sampling point (each sampling data) included in the one bootstrap sample, a division element to which the sampling point belongs is decided in the accumulated probability distribution, and an accumulated probability corresponding to each sampling point is acquired.

(2) Based on a result acquired at (1), a distribution (For example, one axis represents the accumulated probability, and the other axis represents a frequency) of the accumulated probability is calculated. A statistical value (an expected value or a predetermined percent point such as 50% point) in the distribution is acquired as a positioning value. In this case, a standard deviation and a higher-order moment may be acquired as a reference index of positioning.

(3) By repeating (1) and (2), a positioning value of another bootstrap sample is also acquired. Then, based on positioning values acquired from all bootstrap samples, a distribution (For example, one axis represents the positioning value, and another axis represents a frequency) of the positioning value is acquired. Moreover, if the positioning value is biased on the whole, a mediate point in a range of the positioning value may be scaled (multiplied with a relative rate) with an average (or a predetermined percent point such as 50%) of the accumulative probability distribution.

At S18, a positioning calculation unit 44 in the positioning calculation processing unit 41 calculates a positioning of the electronic equipment (observation target) based on a positioning value distribution acquired at S17. For example, an expected value of the positioning value distribution (acquired at S17) is calculated, a division element corresponding to the expected value is specified in the accumulated probability distribution, and a representative point of the specified division element, for example, a center point (a center value in each index range of the division element), is acquired as the last positioning value of the electronic equipment.

At S19, the output unit 71 in the monitoring device 2 outputs a positioning value (acquired at S18) via the display unit 5 of the electronic equipment, i.e., the positioning value is displayed on the display unit 5 (Refer to a left lower part of FIG. 4. Furthermore, refer to FIGS. 8 and 10 explained afterwards).

Figure 12:
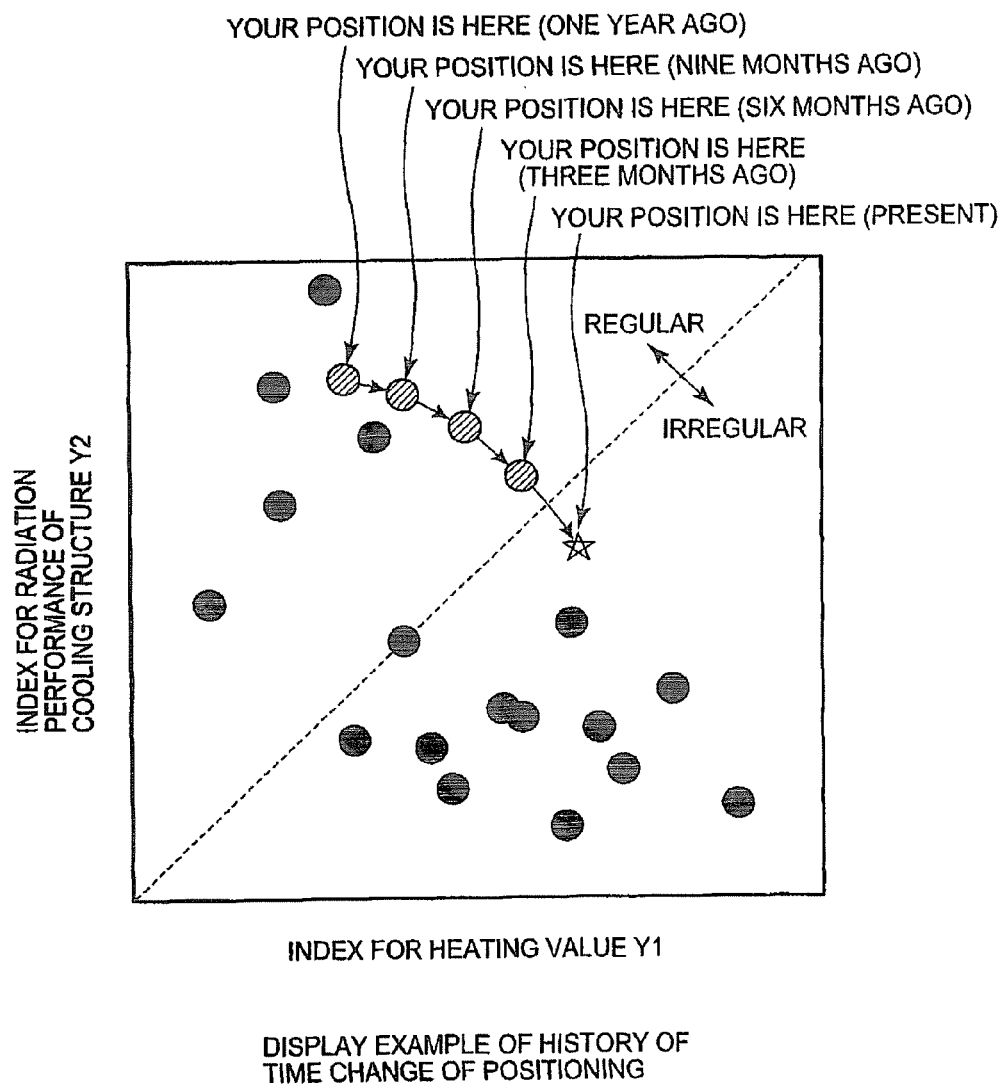
FIG. 12 is a chart representing time change of the positioning.

By executing the processing flow (FIG. 3) of the electronic equipment at a predetermined interval, a history of time change of the positioning value may be displayed as shown in FIG. 12. In FIG. 12, a history of change of the positioning value every three months is displayed. This history is stored in the storage unit 61. In this case, a space comprising a plurality of indexes may be previously separated into a regular region and an irregular region by a designer. When the positioning value is near the irregular region (For example, a distance between the positioning value and the irregular region is below a threshold), the output unit 71 may inform the purport to a user of the electronic equipment via the display unit 5.

[Classification of Category (Detail of the Classification Unit 181 and the Statistical Quantity Estimation Unit 171)]

Figure 6:
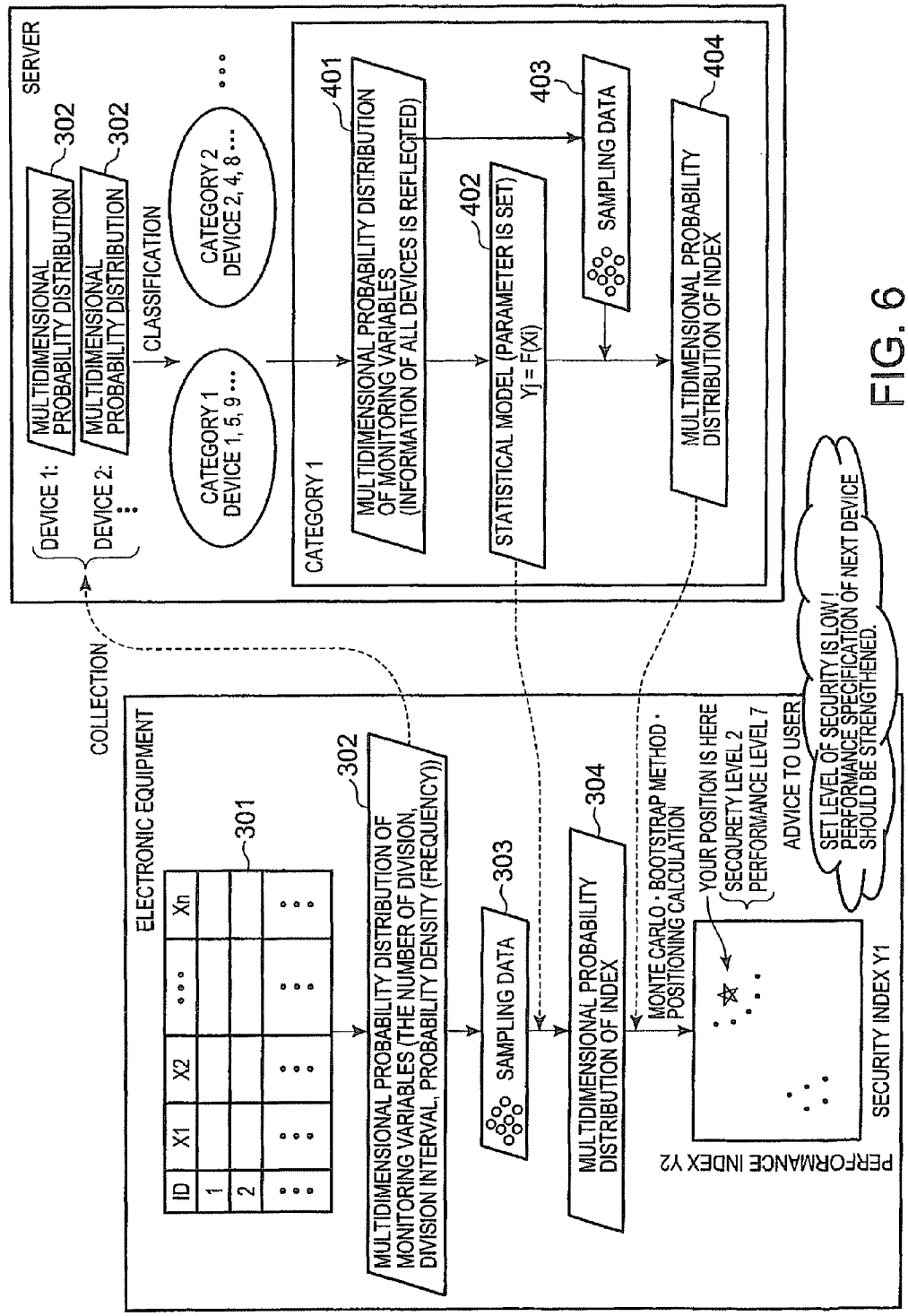
FIG. 6 is another data flow in the flow chart of FIG. 3.

In the processing flow of FIG. 3, the server 101 equally executes the processing for each of all electronic equipments. However, the classification unit 181 in the server 101 can classify all electronic equipments into a plurality of categories (groups), and can differently execute processing for each category. Classification of category is shown in right upper part of FIG. 6. As shown in FIG. 6 and a broken line of FIG. 7 (explained afterwards), the server 101 executes processing of S22~S29 for each category. In this case, for example, whenever classification of category is changed, above-mentioned processing may be executed. As a method for classifying category, following method can be used.

For example, by notifying the server 101 of an eigenvalue or a user ID of the electronic equipment, category-classification may be performed based on a range of the eigenvalue or the user ID. Alternatively, by selecting a category of the electronic equipment with the user and by notifying the server 101 of the category, the server 101 may perform category-classification.

Furthermore, category-classification may be performed based on a bad condition (irregular state) or a good condition (regular state) of the electronic equipment. For example, by notifying the server of a positioning value (acquired at each electronic equipment), the server 101 may decide the bad condition (irregular state) or the good condition (regular state) based on the positioning value and perform the category-classification. Furthermore, by acquiring the bad condition (irregular state) or the good condition (regular state) of the electronic equipment with another method, the category-classification may be performed.

Furthermore, the category-classification may be performed based on the multidimensional probability distribution (individual multidimensional distribution) 302. For example, by previously corresponding a range of monitoring variables with a category, category-classification may be performed based on a range including an expected value of the multidimensional probability distribution (individual multidimensional distribution) 302 of each electronic equipment. Furthermore, by previously notifying the monitoring device (of each electronic equipment) of the range (for category-classification), the monitoring device may specify a category to which its electronic equipment belongs, and notify the server 101 of the category.

Furthermore, at S23, by analyzing a cluster of an overall multidimensional probability distribution (overall multidimensional distribution) 401 (acquired at the server 101) and by specifying the cluster to which each electronic equipment belongs, category-classification may be performed. For example, a category of the electronic equipment may be specified as a cluster corresponding to a statistical value (such as an expected value) in the multidimensional probability distribution (individual multidimensional distribution) 302 of each electronic equipment.

Furthermore, based on the multidimensional probability distribution (individual index multidimensional distribution) 304 of each electronic equipment, category-classification may be performed. By previously corresponding a range of index value with a category, category-classification may be performed based on the range including the expected value of the multidimensional probability distribution (individual index multidimensional distribution) 304. In this case, the monitoring device of the electronic equipment notifies the server 101 of the expected value, and the server 101 specifies a category of the electronic equipment. Alternatively, by previously notifying the monitoring device of the electronic equipment of information between the range and corresponding category, the monitoring device may specify a category to which the electronic equipment and notify the server 101.

Furthermore, at S29, by analyzing a cluster of an overall index multidimensional probability distribution (overall index multidimensional distribution) 404 (acquired at the server 101) and by specifying the cluster to which each electronic equipment belongs, category-classification may be performed. For example, a category of the electronic equipment may be specified as a cluster corresponding to an expected value in the multidimensional probability distribution (individual index multidimensional distribution) 304 of each electronic equipment.

Figure 7:
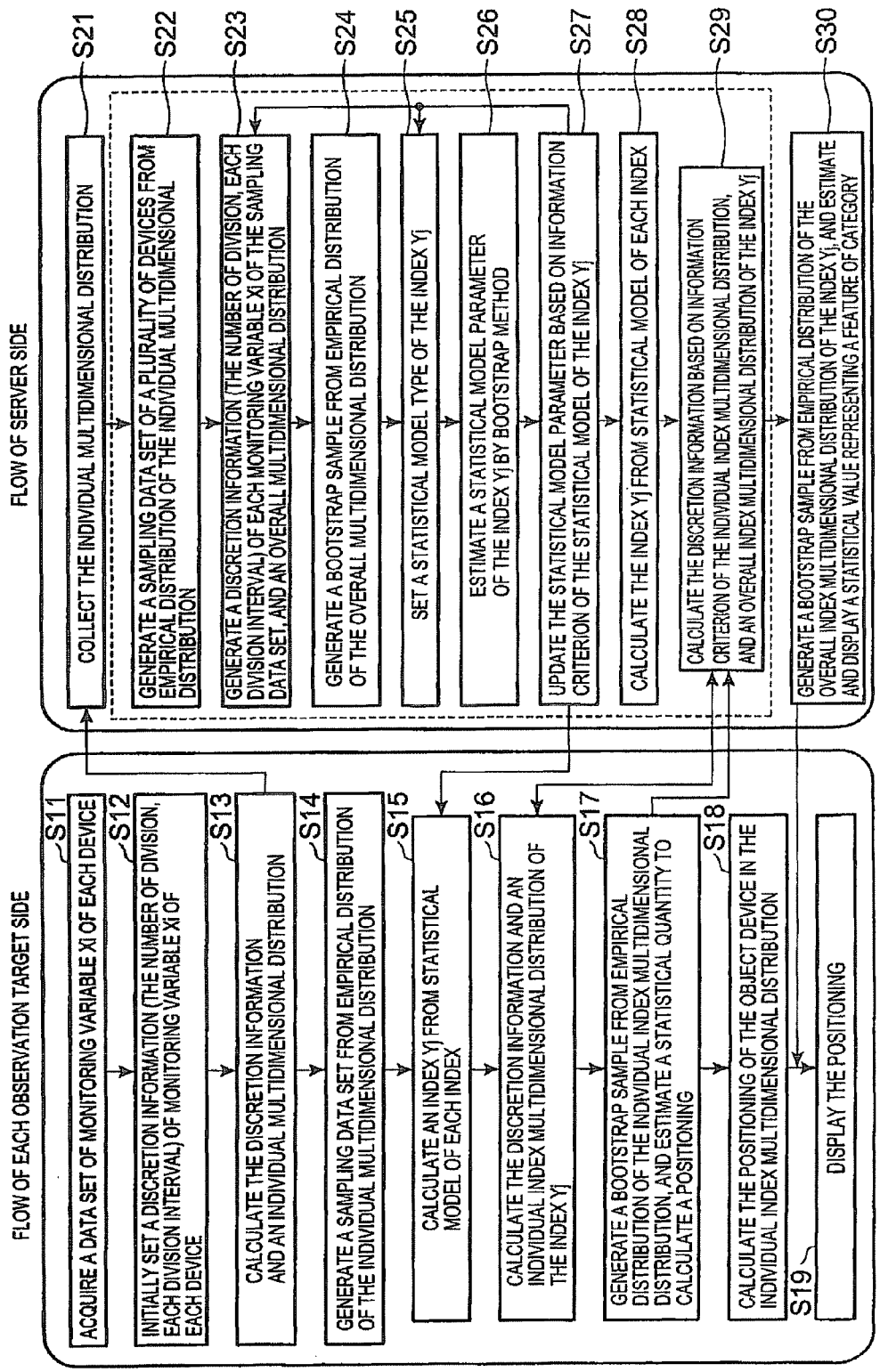
FIG. 7 is another flow chart of processing between the monitoring device and the server in FIG. 2.

FIG. 7 is a flow chart of operation of the monitoring device 2 and the server 101 in case of utilizing the statistical quantity estimation unit 171 and the classification unit 181 of the server 101. In comparison with FIG. 3, new step S30 is added to the flow chart of FIG. 7. The classification unit 181 previously classifies electronic equipments into a plurality of categories (groups), and executes processing of S22~S29 (Refer to broken line of right side in FIG. 7) for each category. Accordingly, the electronic equipment 2 can know a position in the category to which the electronic equipment belongs.

The statistical quantity estimation unit 171 in the server 101 executes following processing at new step S30. As to each category, by using the multidimensional probability distribution (overall index multidimensional distribution) 404 of index Yj as the empirical distribution, a plurality of bootstrap samples is generated, and a statistical quantity representing a feature of each category is calculated based on the plurality of bootstrap samples. For example, a positioning expected value of each bootstrap sample is calculated, a distribution of the expected value is acquired, and a desired statistical quantity (such as an expected value, a center value or a standard deviation) is calculated as a statistical quantity representing a feature of each category, from the distribution of the expected value. The server 101 collectively displays the statistical quantity of each category via the display unit 102.

Furthermore, the server 101 transmits the statistical quantity of each category to the electronic equipment belonging to the category. Alternatively, by corresponding each range of the statistical quantity with a feature of the range, the feature data corresponding to the range including a statistical quantity calculated may be transmitted to the electronic equipment belonging to the category. In the monitoring device 2 of the electronic equipment, the output unit 71 outputs the statistical quantity or the feature data (received from the server) via the display unit 5. Accordingly, a user of the electronic equipment can know a position of the category to which the electronic equipment belongs. Moreover, a statistical quantity and feature data of another category may be transmitted to the electronic equipment and displayed via the display unit 5. As a result, the user can confirm a positioning of the category to which his/her electronic equipment belongs, in comparison with another category.

[Concrete Example of Index Yj to Evaluate a State of the Electronic Equipment]

Figure 8:
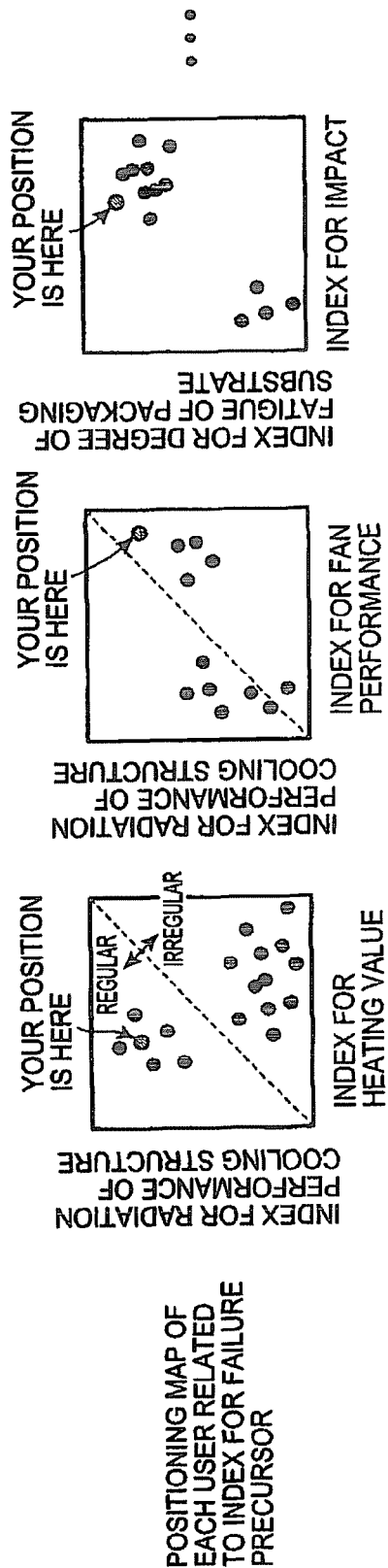
FIG. 8 is one example of a positioning calculation in case that an index to evaluate an electronic device is an index for failure precursor.
Figure 9:
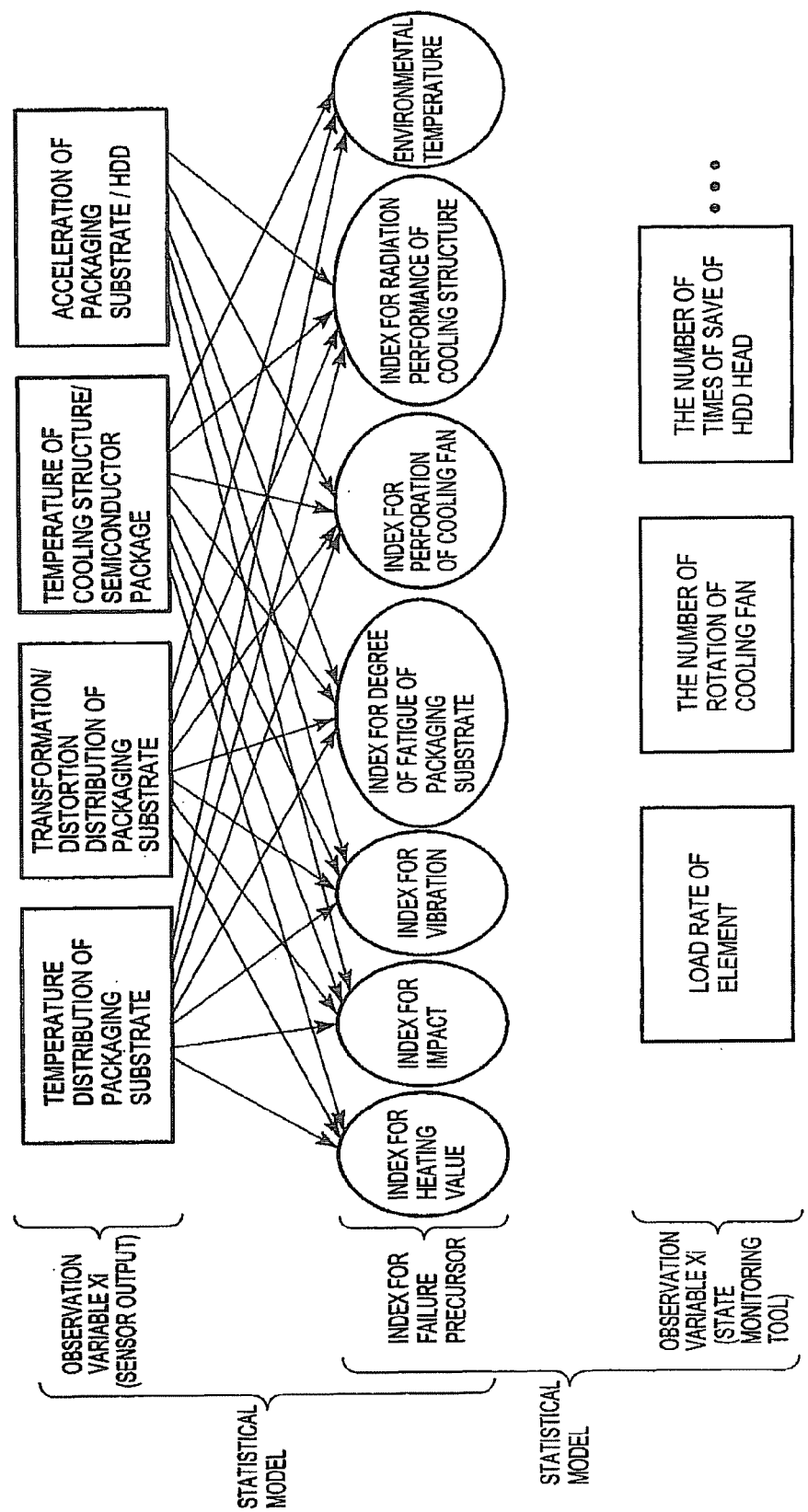
FIG. 9 is one example of a statistical model in case that the index to evaluate an electronic device is the index for failure precursor.
Figure 10:
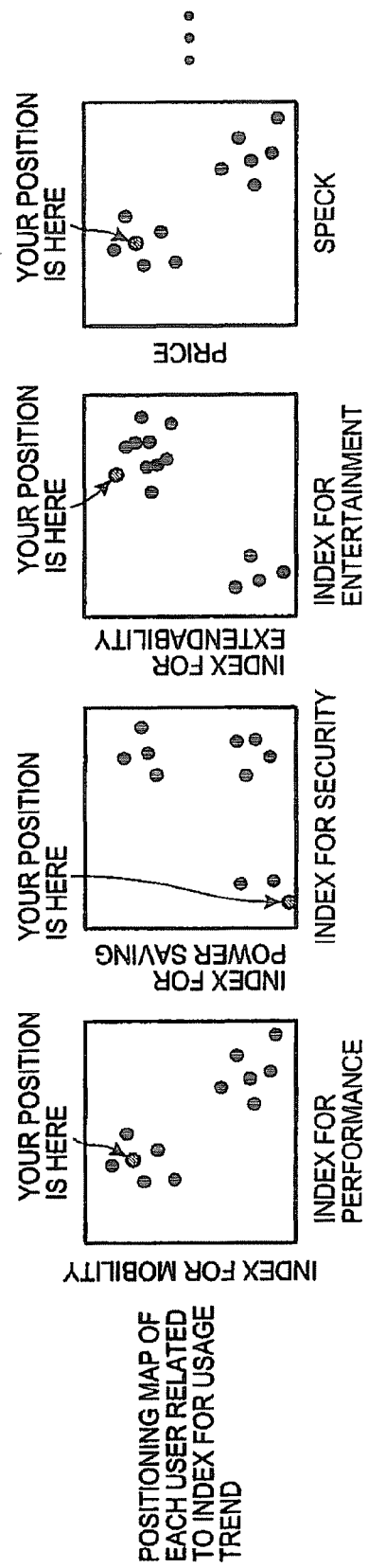
FIG. 10 is one example of a positioning calculation in case that an index to evaluate an electronic device is an index for usage trend.
Figure 11:
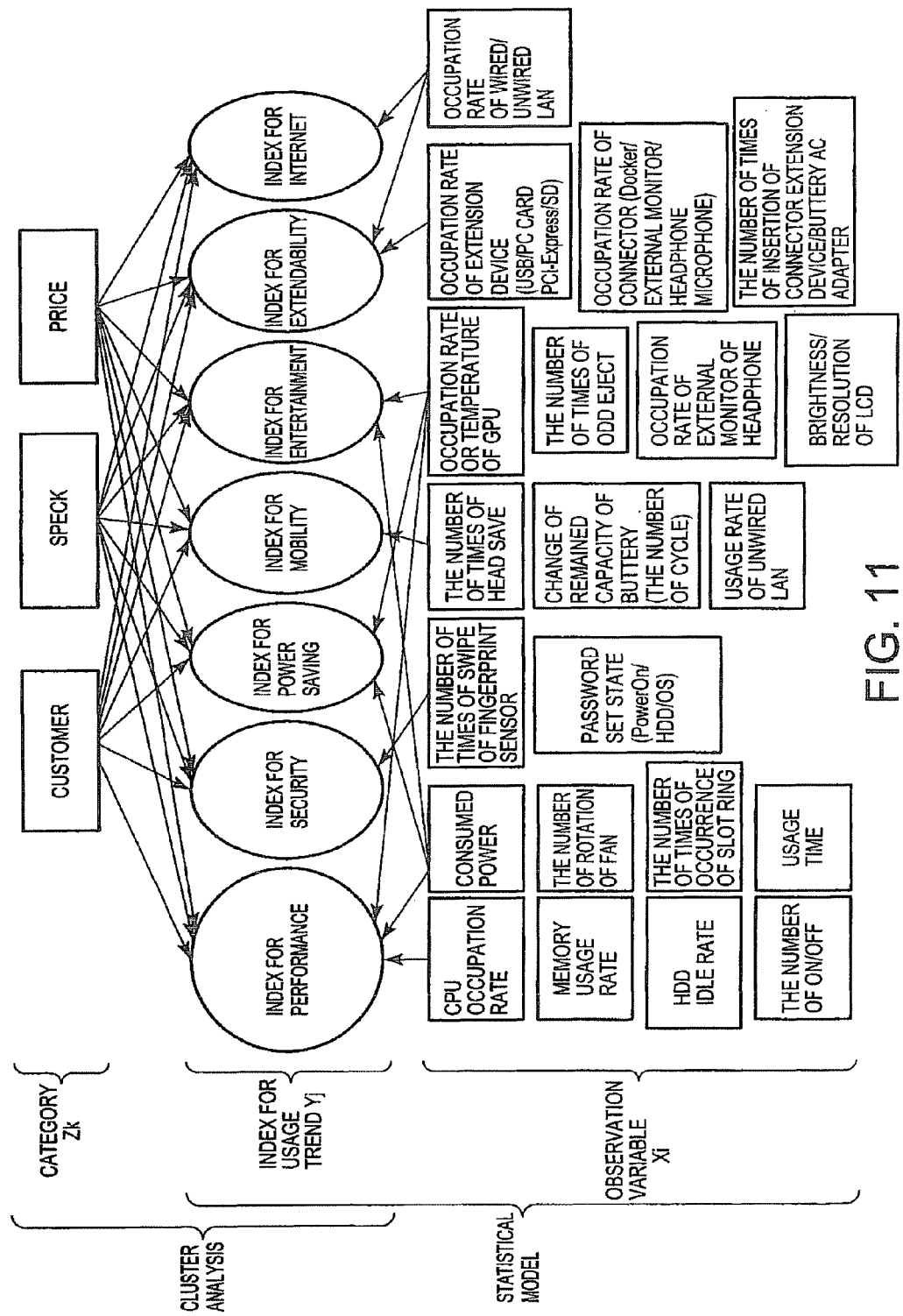
FIG. 11 is one example of a statistical model in case that the index to evaluate an electronic device is the index for usage trend.

FIG. 8 is one example of positioning calculation in case that an index Yj to evaluate the electronic equipment is an index for failure precursor. FIG. 9 is one example of a statistical model in case of FIG. 8. Furthermore, FIG. 10 is one example of positioning calculation in case that an index Yj to evaluate the electronic equipment is an index for usage trend. FIG. 11 is one example of a statistical model in case of FIG. 10. The index Yj (index for failure precursor of the device, index for usage trend of the user) in FIGS. 9 and 11 is effective in case that the digital equipment (such as a notebook PC) is an object.

Concretely, as the index for failure precursor, as shown in FIGS. 8 and 9, an index for drop impact, an index for cooling performance degradation, an index for heating load, an index for degree of fatigue, an index for degradation of storage device, and an index for degradation of buttery, are considered. Furthermore, as the index for usage trend, as shown in FIGS. 10 and 11, an index for performance based on system load state such as occupation rate of CPU, GPU or memory, an index for mobility representing frequency of mobile usage, an index for security representing degree of security setting of system, network or file, an index for net connection representing frequency of Internet usage, and an index for usage of peripheral equipment representing usage frequency of extendable device such as USB slot, are considered.

Positioning information of the object equipment can be used for monitoring/diagnosing failure of the equipment. The index for usage trend can be used for tuning of machine-setting when a user utilizes the machine. Furthermore, the index for usage trend can be used for advising a suitable machine-speck to each user when the user buys a next equipment.

[Calculation (Example 1) of Discretion Information (Discretion Parameter) by Discretion Information Calculation Unit 22 and 34 in the Monitoring Device 2 and Discretion Information Calculation Unit 123 and 144 in the Server 101]

In conventional elementary statistics, in order to determine the number of division (levels) c' to discretize a histogram, Sturges' formula is used.

$$c' = 1 + \frac{\log_{10} n}{\log_{10} 2} = 1 + 3.32 \log_{10} n$$

However, this formula cannot cope with complexity of distribution. Accordingly, in the present embodiment, a concrete method for discretizing by using a predetermined evaluation function (evaluation criterion) is explained as one example. As mentioned-above, as the predetermined evaluation criterion, AIC (Akaike Information Criterion), a general information criterion (GIC), a bootstrap information criterion and a Bayesian information criterion, are used. In addition to this, an evaluation criterion with cross validation is used. Hereinafter, steps based on AIC are explained.

In order to create a histogram, by setting a boundary value of each level, the number (frequency) of observed values belonging to each level is counted, and a relative frequency is calculated by dividing the frequency with the number of data. This frequency distribution table is called a histogram. In the histogram, in case that a vertical axis represents the frequency or the relative frequency, or in order to easily compare histograms of which level-scales are different, a value which the relative frequency is divided by a width of each level (length of each section), i.e., a probability density, may be scaled.

In this case, observed values $x_1, \ldots, x_n$ included in a section (a,b) are classified by dividing points $a = a_0 < a_1 < \ldots < a_c = b$ ($a_i = a + i\Delta a$), a frequency n(i) of observed values included in a section $I_i = (a_{i-1}, a_i)$ is divided by a size n of sample, and a relative frequency n(i)/n is divided by $\Delta a$. By setting this calculation result to a height, a rectangle of which the base is each section is created, i.e., a histogram is acquired. In this case, an area of a rectangle along a section $I_i$ is represented as "n(i)/[n$\Delta a$]×$\Delta a$=n(i)/n". Accordingly, a total area is represented as follows.

$$\sum_{i=1}^{n} \frac{n(i)}{n} = 1$$

In this case, a method for dividing levels is a question. A purpose of the histogram is estimation of characteristic of a population distribution including extracted data. If the number of levels (the number of division) is smaller than the number of data, information to be acquired from the data is deleted, and a shape of the population distribution including the data cannot be often represented. Conversely, if the number of levels is larger than the number of data, data quantity transmitted between the server and electronic equipments (monitoring devices) becomes enormous. Accordingly, in order to satisfy both requests, classification of levels need be suitably set.

Hereinafter, as to a method for setting classification of levels using AIC, one example of concrete steps is explained. Assume that independent observed values $x_1, \ldots, x_n$ are acquired, the minimum is x(1), the maximum is x(n), and accuracy of the observed value is d. By equally dividing a section [x(1)−0.5 d, x(n)+0.5 d] with c, each of n-observed values is included in any of levels (sections). Accordingly, by counting a frequency n(i) (i=1, . . . , c) for each of c-levels, a frequency distribution is first acquired.

By considering relationship between the number of samples (the number of observed values) and the number of free parameters (For example, the number of division in case of histogram, the number of unknown parameters in case of regression model), it is defined that "c=[2√n]−1". In this formula, [ ] is Gauss symbol, and [a] represents the largest integral number not above a.

From above-mentioned section (The section [x(1)−0.5 d, x(n)+0.5 d] is equally divided with c) as a start point (an initial section), by changing classification of levels orderly (by applying various classification models), the most suitable frequency distribution (histogram) having reduced number of free parameters and correctly representing a population distribution (including sample data) is acquired. If the evaluation criterion is an AIC, by minimizing the AIC, the number of free parameters can be reduced.

Next, from the histogram having initial classification, generation of a histogram of which center levels are equally classified and both side levels are unequally classified (i.e., a width of each level at center part is equal, and a width of each level at both sides is unequal) is thought about. In order to simplify the explanation, the case that a probability distribution of the object is one-dimensional is explained. In the initial section, the numbers of levels at both sides to be unified are respectively represented as c1 and c2. At the center part, levels having the number of levels "r" are tried to be unified respectively. A model corresponding to such unification is represented as "discretion model (c1,r,c2)", which is as follows. In a formula, P represents a probability and θ represents a maximum likelihood estimator.

Discretion model (c1,r,c2):

$$P(1)=p(2)=\ldots=p(c_1)=\theta(1)$$

$$P(c_1+(j-2)r+1)=\ldots=p(c_1+(j-1)r)=\theta(j), j=2\ldots, \{(c-c_1-c_2)/r\}+1$$

$$p(c-c_2+1)=\ldots=p(c)=\theta(\{(c-c_1-c_2)/r\}+2)$$

This model has a constraint

"$c_1\theta(1)+r\Sigma\theta(j)+c_2\theta(\{(c-c_1-c_2)/r\}+2)=1$".

As to each of "$j=1,\ldots,\{(c-c_1-c_2)/r\}+2$", by calculating a maximum likelihood estimator $\theta(j)$, necessary AIC is calculated as follows.

$$AIC(c_1, r, c_2) =$$
$$-2 \times (MAXIMUM\ LOGARITHMIC\ LIKELIHOOD\ OF\ MODEL) +$$
$$2 \times (THE\ NUMBER\ OF\ FREE\ PARAMETERS\ OF\ MODEL) =$$

$$(-2)\left[\left(\sum_{i=1}^{c_1} n(i)\right)\log\left(\sum_{i=1}^{c_1} \frac{n(i)}{c_1 n}\right) + \right.$$

$$\sum_{j=2}^{(c-c_1-c_2,ir)+1}\left\{\left(\sum_{i=c_1+(j-2)r+1}^{c_1+(j-1)r} n(i)\right)\log\left(\sum_{i=c_1+(j-2)r+1}^{c_1+(j-1)r} \frac{n(i)}{m}\right)\right\} +$$

$$\left.\left(\sum_{i=c-c_2+1}^{c} n(i)\right)\log\left(\sum_{i=c-c_2+1}^{c} \frac{n(i)}{c_2 n}\right)\right] + 2\left(\frac{c-c_1-c_2}{r}+1\right)$$

As to a histogram created by above-mentioned unification, a frequency and the number of levels are respectively represented as n' (i) and c'. In this case, AIC is represented as follows.

$$AIC(c_1, r, c_2) =$$
$$(-2)\left\{n'(1)\log\frac{n'(1)}{c_1 n} + \sum_{j=2}^{c'-1} n'(j)\log\frac{n'(j)}{m} + n'(c')\log\frac{n'(c')}{c_2 n}\right\} + 2(c'-1)$$

Above formula represents that, if only values ($c_1,r,c_2$) are known, even if a frequency distribution at the initial section is unknown, information criterion can be calculated from a frequency distribution table after pooling. Moreover, it is conveniently regarded that $n(i)=e^{-1}$ in case of $n(i)=0$ (or n' (i)=0). By using this AIC as an index, discretion information can be determined. For example, the discretion information (discretion parameter) of which AIC (index) is the minimum is selected. In the present embodiment, above formula of AIC is one example of the evaluation function, and values ($c_1,r,c_2$) are one example of discretion parameters.

Above explanation is based on one-dimensional probability distribution. As to multidimensional probability distribution, by representing division elements multidimensionally, information criterion (evaluation criterion) such as AIC can be calculated in the same way. Accordingly, suitable discretion information can be selected.

In case of a multidimensional probability distribution is represented by a Kernel density function, the Kernel density function is estimated using a risk function as a model evaluation criterion, and information of the multidimensional probability distribution (the number of division, each division interval, a probability density (or frequency) in each division element) is calculated based on the Kernel density function. When an empirical distribution to calculate a bootstrap sample is determined from a multidimensional probability distribution based on the Kernel density function, in the same way as histogram model, the number of division and each division interval can be determined based on the model evaluation criterion.

[Example of Parameter Estimation (Estimation of Statistical Model) by Model Parameter Calculation Unit 134]

For example, in case that data of index Yj is stored and a prior distribution is experiencedly composed based on prior stored information, a hierarchical Bayesian modeling can be used as one form of statistical model of index Yj. In this case, a database storing prior data of index Yj (or a database storing a relation formula between observed data (monitoring variable) X and index Yj, and a distribution of X) is prepared, and a prior distribution model is prepared based on this database. Whenever a multidimensional probability distribution (individual multidimensional distribution) is extended from a large number of observation targets (electronic equipments), a statistical model parameter of index Yj is estimated by the hierarchical Bayesian modeling, and a posterior distribution is calculated. Accordingly, stable and more robust estimation is possible. Hereinafter, the hierarchical Bayesian model is explained in detail.

As to creation of a hierarchical Bayesian model, a statistical model (probability model) P(X,Y) of index Y for observation data X is thought about. Y represents an index (potential variable). A previous information and knowledge for potential variable Y is represented by a prior distribution (probability distribution) P(Y|α). By a posterior distribution P(Y|X)∝P(X|Y)P(Y|α) calculated based on Bayesian theory, a large number of model parameters (a parameter to prescribe a type of probability model P (For example, a standard deviation or an average)) can be statistically estimated with stability. A hyper parameter is represented by α. By assuming the prior distribution P(α) for the hyper parameter α, the posterior distribution P(Y|X; α)∝P(X|Y)P(Y|α)P(α) in an extended space (Y, α) is thought about. In this way, the statistical model is represented by a hierarchical structure P(X|Y)P(Y|α)P(α)dY. By determining α to maximize a marginal distribution (marginal probability density) P(α|X)∝∫P(X|Y)P(Y|α)P(α)dY, the model parameter is estimated using α.

Hereinafter, data processing steps by the hierarchical Bayesian model is explained.

(1) An observation data set as the object is set (sampling points are acquired for each object category). Briefly, one bootstrap sample generated at S24 is acquired.

(2) A type of data distribution model P(X|Y; α) is determined. Briefly, a type of probability model P is determined. In this case, determination of type is performed at S25. However, in order to simplify the explanation, determination of type is included in estimation of parameter. Moreover, P(X|Y; α) is equal to a general notation of a right P(X|Y)P(Y|α)P(α) in a formula of above-mentioned posterior distribution.

(3) A form P(Y|α) of the prior distribution is determined. This may be determined using above-mentioned database or without the database (In latter case, the database is unnecessary).

(4) A model parameter of a data distribution model and a parameter α of the prior distribution are determined by optimizing an evaluation criterion (an evaluation function based on the evaluation criterion) such as information criterion (For example, ABIC). First, the parameter α of the prior distribution is calculated by optimizing the evaluation criterion. Next, the model parameter of the data distribution model (model parameter of probability model P) is calculated by optimizing the evaluation criterion (using the optimized α). In this processing (4), a bootstrap sample acquired at (1) is used.

(5) Above processing (4) is repeated by selecting another bootstrap sample. As a result, a distribution of the model parameter is acquired (For example, a horizontal axis represents the model parameter and a vertical axis represents a distribution of probability density), and a statistical estimation quantity (For example, an expected value) of the distribution is determined as the model parameter. In case of the Bayesian model, information of the statistical model to be transmitted to each observation target includes a type of probability model P, the model parameter (determined) and the hyper parameter α.

In above explanation, the hierarchical Bayesian model is described as the statistical model. However, this is one example. By using another model (such as a regression model Y=f(X)) as one form of another statistical model of index Yj, the model parameter can be determined in the same way as above explanation. In this case, the regression model is a probability model P which error is based on a normal distribution.

[Calculation (Example 2) of Discretion Information]

(A) FIG. 16 is one example that discretion information A is updated by comparing a multidimensional probability distribution 404 (discretion information (a second discretion parameter) A, a probability density or a frequency of each division element) of index Yj in the server 101 to a multidimensional probability distribution 304 (discretion information (a fourth discretion parameter) B, a probability density or a frequency of each division element) of index Yj in each electronic equipment.

As concrete steps, a division element having the probability density (or frequency) larger than a threshold is extracted from division elements of the discretion information B. If a ratio (all ratio along each axis) of a width of a corresponding division element in the discretion information A to a width of the division element (extracted) is larger than a threshold, the corresponding division element in the discretion information A is classified as the predetermined number of division (The threshold of the ratio and the predetermined number of division are previously set). The corresponding division element may be equally divided. Alternatively, as shown in FIG. 16, a region (in the discretion information A) adjacent to the division element (extracted in the discretion information B) may be divided minutely, and another region (in the discretion information A) depart from the division element (extracted in the discretion information B) may be divided roughly.

(B) A function to calculate a sum of a value of evaluation criterion (a second evaluation function) for statistical model of index Yj at the server 101 and a value of evaluation criterion (a third evaluation function) for discretion model of multidimensional probability distribution 404 of index Yj at the server side 101 is optimized (maximized or minimized). By this optimization, a parameter of statistical model of index Yj and a discretion information (the second discretion parameter) to calculate the multidimensional probability distribution 404 are determined (Refer to an arrow flow from S27 to S23 in FIG. 3).

Concretely, the statistical estimation unit 131 changes the model parameter by predetermined method. Whenever the model parameter is changed, the second server side generation unit 141 calculates (optimizes) the discretion information (the second discretion parameter) for spatial division using the statistical model of each index Yj (j=1~K) to which the model parameter is set. Whenever the model parameter is changed, the statistical estimation unit 131 calculates a value of evaluation criterion (a second evaluation function) for statistical model of each index Yj (j=1~K) to which the model parameter is set, and calculates a function to calculate a sum of input variables which are the value of evaluation criterion (the second evaluation function) for each statistical model and the value of evaluation criterion (the third evaluation function) for the discretion information (the second discretion parameter). Then, the model parameter at which a value of the function is maximized or minimized is selected. The second server side generation unit 141 executes processing using statistical models (1~K) to which the model parameter selected is set. The statistical estimation unit 131 transmits the statistical model (1~K) to each monitoring device.

(C) A function to calculate a sum of a value of evaluation criterion (the second evaluation function) for statistical model of index Yj at the server 101 and a value of evaluation criterion (a fifth evaluation function) for discretion model of multidimensional probability distribution 304 of index Yj at each observation target is optimized (maximized or minimized). By this optimization, a parameter of statistical model of index Yj and discretion information (the fourth discretion parameter) to calculate the multidimensional probability distribution 304 are determined.

Concretely, at the server 101 side, the statistical estimation unit 131 changes the model parameter by predetermined method. Whenever the model parameter is changed, the statistical model (1~K) to which the model parameter is set is transmitted to each monitoring device. Whenever the statistical model (1~K) is transmitted, the statistical estimation unit 131 receives a value of evaluation criterion (the fifth evaluation function) for discretion information (the fourth discretion parameter) acquired in correspondence with the statistical model (1~K) from each monitoring device. Whenever the model parameter is changed, the statistical estimation unit 131 calculates a value of evaluation criterion (the second evaluation function) for the statistical model (1~K). Furthermore, the statistical estimation unit 131 calculates a function to calculate a sum of input variables which are the value of evaluation criterion (the second evaluation function) for the statistical model (1~K) and the value of evaluation criterion (the fifth evaluation function) for the discretion information (the fourth discretion parameter) from each monitoring device. Then, the model parameter at which a value of the function is maximized or minimized is selected. The statistical estimation unit 131 may transmit data indicating that the statistical models (1~K) are used, to each monitoring device.

On the other hand, at the monitoring device side, whenever the model parameter is changed, the second device side generation unit 31 receives the statistical models (1~K) from the server 101. Briefly, the statistical models (1~K) are receives at plural times. In this case, the second device side generation unit 31 also receives a value of evaluation criterion (the second evaluation function) for the statistical models (1~K). Whenever the statistical models (1~K) are received, the second device side generation unit 31 optimizes discretion information (the fourth discretion parameter) to divide a space comprising index Yj, calculates a function to calculate a sum of input variables which are the value of evaluation criterion (the fifth evaluation function) for the optimized discretion information and the value of evaluation criterion (the second evaluation function) for the statistical models (1~K) received. Last, when a value of the function is maximized or minimized, the discretion information (the fourth discretion parameter) and the statistical models (1~K) are selected.

(D) A function to calculate a sum of a value of evaluation criterion (the second evaluation function) for statistical model of index Yj at the server 101, a value of evaluation criterion (the third evaluation function) for discretion model of multidimensional probability distribution 404 of index Yj at the server side 101, and a value of evaluation criterion (the fifth evaluation function) for discretion model of multidimensional probability distribution 304 of index Yj at each observation target, is optimized (maximized or minimized). By this optimization, a parameter of statistical model of index Yj, discretion information (the second discretion parameter) to calculate the multidimensional probability distribution 404, and discretion information (the fourth discretion parameter) to calculate the multidimensional probability distribution 304, are determined. Concrete processing of (D) are apparent from (B) and (C). Accordingly, its explanation is omitted.

In examples (B)~(D), a function to calculate the sum of value of each evaluation criterion is used. Except for this function, another function (such as a weighted linear sum having weight based on priority of the evaluation criterion, or a square sum) may be used. For example, by setting a weight (0~1) to a coefficient of each evaluation criterion, a function of which variables are each evaluation criterion can be determined. In addition to this, a risk function of Kernel density function or a loss function of Bayesian model can be used. On a constraint condition that the value of evaluation criterion for discretion model of multidimensional probability distribution of index Yj of each observation target is within a predetermined range, the evaluation criterion for statistical model of index Yj may be optimized. Briefly, a method for calculating based on combination of the constraint condition and the optimization may be used.

In above-mentioned embodiment, the first~fourth discretion parameters and the statistical models (1~K) are determined so that each evaluation function is maximized or minimized. However, the evaluation function respectively used may be equal or different. An arbitrary function representing above-mentioned information criterion can be used based on the purpose.

In FIG. 1, each unit 11~51 and 71 in the monitoring device 2, and each unit 111~151, 171 and 181 in the server 101, may be composed by a hardware or a program module. In case of composing each unit by the program module, each program module is stored in a recording medium such as a nonvolatile memory or a hard disk, and read from the recording medium by a computer such as a CPU. The program module is extended onto a memory device such as a RAM, or directly executed.

Furthermore, the storage unit in the monitoring device 2 and the storage unit 161 in the server 101 can be composed as, for example, a recording medium such as a memory device, a hard disk, a CD-ROM or a USM memory.

As mentioned-above, in the present embodiment, a positioning of each electronic equipment in all electronic equipments is calculated in a space of which axes are indexes (statistical models) to evaluate a state of the electronic equipment (observation target). In this case, statistical estimation by bootstrap method can be effectively executed. Accordingly, response/accuracy of data analysis can be improved, and data quantity to be transmitted between each observation target and the server can be reduced.

Briefly, a data set of monitoring variable Xi (collected at each observation target) and a data set of index Yj are often in large quantities with a monitoring period or a sampling interval. If the data set is transmitted or stored as raw data, the response time delays, or non-economical status occurs.

In the present embodiment, after the data set of monitoring variable Xi and the data set of index Yj are discretized, a multidimensional probability distribution (discretion information (the number of division, each division interval), a probability density (or a frequency) of each division element) thereof is stored. If necessary, by subjecting Monte Carlo sampling to the multidimensional probability distribution as the empirical distribution, sampling points are generated as the number of necessary data. The sampling points are practically used for estimation of statistical model of index Yj, calculation of positioning, or re-discretization of the multidimensional probability distribution in case of adding new data. Transfer data between the server and the electronic equipment and storage data in the server and the electronic equipment are the multidimensional probability distribution (discretion information (the number of division, each division interval), a probability density (or a frequency) of each division element) only. Accordingly, data quantity can be compressed. As a result, effective transfer, deletion of storage device and practical usage thereof are possible.

Furthermore, in the present embodiment, based on an individual multidimensional distribution acquired from each observation target, the server side generates a statistical model and an overall index multidimensional distribution, and transmits them to each monitoring device. Each monitoring device calculates of a positioning by using the statistical model and the overall index multidimensional distribution (received from the server) Accordingly, the positioning of each observation target can be executed by mutually matching discretization of the data set of each observation target (discretization of the individual multidimensional probability distribution), determination of the statistical model of the index, and discretization of the overall index multidimensional probability distribution. Especially, by executing above-mentioned processing (B)~(D), this effect can be further raised.

As mentioned-above, in the present embodiment, in case of transferring data between each observation target and the server (apparatus for collecting and analyzing data of each observation target) via a network, the data quantity can be reduced, and the computation quantity at each observation target and the server can be minimized. Furthermore, adaptation with actual data distribution can be optimized.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A server for communicating with a plurality of monitoring devices via a network, each of the monitoring devices acquiring monitoring variables (1~H; H is an integral number larger than 1) from an observation target and generating an individual multidimensional distribution of the monitoring variables, the server comprising:

a receiving unit configured to collect the individual multidimensional distribution from each of the monitoring devices, a first space defined by axes of the monitoring variables (1~H) being divided into a plurality of first elements at each of the monitoring devices, the individual multidimensional distribution representing a probability density or a frequency of the monitoring variables belonging to each of the first elements in the first space;

a first server side generation unit configured to generate first sampling data by sampling the individual multidimensional distribution collected, to determine a first discretion parameter using the first sampling data so that a first evaluation function including the first discretion parameter is maximized or minimized, the first discretion parameter indicating a method for dividing the first space, to divide the first space into a plurality of second elements by the first discretion parameter, and to generate an overall multidimensional distribution representing a probability density or a frequency of the first sampling data belonging to each of the second elements in the first space;

a statistical estimation unit configured to determine a model parameter of statistical models (1~K; K is an integral number larger than 1) using the overall multidimensional distribution so that a second evaluation function including the model parameter is maximized or minimized, the model parameter being used for calculating indexes (1~K) to evaluate a state of each observation target from the monitoring variables;

a second server side generation unit configured to generate a second sampling data by sampling the overall multidimensional distribution, to calculate index data of the indexes (1~K) by calculating the statistical models with the second sampling data, to determine a second discretion parameter using the index data so that a third evaluation function including the second discretion parameter is maximized or minimized, the second discretion parameter indicating a method for dividing a second space defined by axes of the indexes (1~K), to divide the second space into a plurality of third elements by the second discretion parameter, and to generate an overall index multidimensional distribution representing a probability density or a frequency of the index data belonging to each of the third elements in the second space; and a transmission unit configured to transmit the overall index multidimensional distribution and the statistical models (1~K) having the model parameter to each monitoring device.

2. The server according to claim 1, wherein
the statistical estimation unit determines the model parameter of the statistical models (1~K) so that a function of which input variables are a value of the second evaluation function and a value of the third evaluation function is maximized or minimized.

3. The server according to claim 1, wherein
the monitoring device determines a fourth discretion parameter using the statistical models received from the server and the individual multidimensional distribution so that a fifth evaluation function including the fourth discretion parameter is maximized or minimized, the fourth discretion parameter indicating a method for dividing the second space,
the statistical estimation unit changes the model parameter of the statistical models (1~K) by a predetermined method,
the transmission unit transmits the statistical models (1~K) having the model parameter changed to each monitoring device whenever the model parameter is changed,
the receiving unit receives a value of the fifth evaluation function from each monitoring device whenever the statistical models (1~K) are transmitted, the statistical estimation unit determines the model parameter of the statistical models (1~K) so that a function of which input variables are a value of the second evaluation function and the value of the fifth evaluation function received from each monitoring device is maximized or minimized.

4. The server according to claim 1, further comprising:
a classification unit configured to classify the plurality of monitoring devices into a plurality of groups, based on a predetermined criterion;
wherein the first server side generation unit, the second server side generation unit and the statistical estimation unit, respectively executes processing for each group.

5. A monitoring device for communicating with a server via a network, the monitoring device being one of a plurality of monitoring devices each corresponding to an observation target, comprising:
a data acquisition unit configured to acquire monitoring variables (1~H) by at least one of a monitoring sensor and a state monitoring tool;
a storage unit configured to store the monitoring variables;
a first device side generation unit configured to determine a third discretion parameter using the monitoring variables so that a fourth evaluation function including the third discretion parameter is maximized or minimized, the third discretion parameter indicating a method for dividing a first space defined by axes of the monitoring variables (1~H), to divide the first space into a plurality of first elements by the third discretion parameter, and to generate an individual multidimensional distribution representing a probability density or a frequency of the monitoring variables belonging to each of the first elements;
a transmission unit configured to transmit the individual multidimensional distribution to the server;
a receiving unit configured to receive statistical models (1~K) and an overall index multidimensional distribution from the server, the statistical models being generated based on the individual multidimensional distribution received from each of the monitoring devices at the server and being used for calculating indexes (1~K) to evaluate a state of the monitoring device from the monitoring variables, the overall index multidimensional distribution being generated based on the statistical models (1~K) and a second space defined by axes of the indexes (1~K) being divided into a plurality of third elements at the server, the overall index multidimensional distribution representing a probability density or a frequency of index data of the indexes (1~K) belonging to each of the third elements in the second space;
a second device side generation unit configured to generate a third sampling data by sampling the individual multidimensional distribution, to acquire index data of the indexes (1~K) by calculating the statistical models with the third sampling data, to determine a fourth discretion parameter using the index data so that a fifth evaluation function including the fourth discretion parameter is maximized or minimized, the fourth discretion parameter indicating a method for dividing the second space defined by axes of the indexes (1~K), to divide the second space into a plurality of fourth elements by the fourth discretion parameter, and to generate an individual index multidimensional distribution representing a probability density or a frequency of the index data belonging to each of the fourth elements in the second space; and a positioning calculation unit configured to acquire a fifth sampling data of the indexes (1~K) by sampling the individual index multidimensional distribution, to transform the overall index multidimensional distribution to an accumulated probability distribution, to specify an accumulated probability of the fourth sampling data in the accumulated probability distribution, to create a distribution representing a probability density or a frequency of the accumulated probability, to calculate an expected value or a predetermined percent point of the distribution, to calculate a positioning value as a representative point of a division element corresponding to the expected value or the predetermined percent point in the accumulated probability distribution, and to output the positioning value.

6. The monitoring device according to claim 5, wherein the first device side generation unit, the second device side generation unit and the positioning calculation unit, respectively execute processing at a predetermined interval or an arbitrary interval, the storage unit stores a history of time transition of the positioning value, and the positioning calculation unit visually outputs the history to a user.

7. The monitoring device according to claim 5, wherein the server changes a model parameter of the statistical models (1~K) by a predetermined method, and calculates a second evaluation function for the statistical models (1~K) whenever the model parameter is changed, the receiving unit, whenever the model parameter is changed, receives the statistical models (1~K) having the model parameter changed and a value of the second evaluation function, and the second device side generation unit, whenever the statistical models (1~K) are received, calculates a function of which input variables are a value of the fifth evaluation function and the value of the second evaluation function, and selects the fourth discretion parameter to maximize or minimize a value of the function.

* * * * *